US012554923B2

United States Patent
Wei et al.

(10) Patent No.: US 12,554,923 B2
(45) Date of Patent: Feb. 17, 2026

(54) DOCUMENT PROCESSING METHOD FOR ONLINE COLLABORATION AND APPARATUS, AND DEVICE AND MEDIUM

(71) Applicant: BEIJING ZITIAO NETWORK TECHNOLOGY CO., LTD., Beijing (CN)

(72) Inventors: Zongyan Wei, Beijing (CN); Hengyu Zhang, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 56 days.

(21) Appl. No.: 18/548,693

(22) PCT Filed: Feb. 28, 2022

(86) PCT No.: PCT/CN2022/078203
§ 371 (c)(1),
(2) Date: Sep. 1, 2023

(87) PCT Pub. No.: WO2022/184004
PCT Pub. Date: Sep. 9, 2022

(65) Prior Publication Data
US 2024/0152690 A1 May 9, 2024

(30) Foreign Application Priority Data
Mar. 1, 2021 (CN) .......................... 202110227846.9

(51) Int. Cl.
*G06F 40/166* (2020.01)
*G06F 3/04842* (2022.01)
(Continued)

(52) U.S. Cl.
CPC ........ *G06F 40/166* (2020.01); *G06F 3/04842* (2013.01); *G06F 3/0486* (2013.01)

(58) Field of Classification Search
CPC ...... G06F 40/166; G06F 3/048; G06F 3/0482; G06F 3/0486; G06F 3/04842
See application file for complete search history.

(56) References Cited

U.S. PATENT DOCUMENTS 5,754,939 A * 5/1998 Herz .................. H04N 21/4622
348/E7.071
5,915,001 A * 6/1999 Uppaluru ................ H04L 67/02
704/270.1
(Continued)

FOREIGN PATENT DOCUMENTS

| CN | 103795813 A | 5/2014 |
| CN | 104036027 A | 9/2014 |

(Continued)

OTHER PUBLICATIONS

International Search Report (with English translation) and Written Opinion issued in PCT/CN2022/078203, dated Apr. 28, 2022, 9 pages provided.

(Continued)

*Primary Examiner* — Nicholas Augustine
(74) *Attorney, Agent, or Firm* — Astute IP Law Group

(57) ABSTRACT

Provided are a document processing method and apparatus, a device and a medium. The method includes that: an editing event of a user for a selection area content block within a selection area range of a current edited document is acquired, where the selection area content block includes at least two content sub-blocks, the selection area content block is content quoted from a source document to a target document, and the current edited document is the source document or the target document; and a synchronous content change is performed on a content block within the selection area range in the source document and a content block (Continued)

within the selection area range in the target document according to the editing event.

20 Claims, 6 Drawing Sheets

(51) Int. Cl.
*G06F 3/0486* (2013.01)
*G06F 3/048* (2013.01)

(56) References Cited

U.S. PATENT DOCUMENTS

| | | | | |
|---|---|---|---|---|
| 6,047,327 A * | 4/2000 | Tso | .................. | G06F 16/958 |
| | | | | 709/219 |
| 6,269,369 B1 * | 7/2001 | Robertson | ............ | G06Q 10/063 |
| 6,459,913 B2 * | 10/2002 | Cloutier | .................. | H04W 4/12 |
| | | | | 379/211.01 |
| 6,501,832 B1 * | 12/2002 | Saylor | ................. | H04M 3/4938 |
| | | | | 379/88.19 |
| 6,697,805 B1 | 2/2004 | Choquier et al. | | |
| 7,127,232 B2 * | 10/2006 | O'Neil | .................. | G06Q 30/04 |
| | | | | 705/40 |
| 7,133,869 B2 * | 11/2006 | Bryan | ................. | H04L 12/1895 |
| | | | | 707/999.102 |
| 7,143,118 B2 * | 11/2006 | Eichstaedt | ......... | H04N 21/4143 |
| | | | | 715/255 |
| 11,487,426 B2 * | 11/2022 | Lee | ..................... | G06F 3/04883 |
| 11,657,351 B2 * | 5/2023 | Niisato | ................ | G06Q 10/103 |
| | | | | 705/7.27 |
| 2002/0042846 A1 * | 4/2002 | Bottan | .................. | H04L 67/306 |
| | | | | 709/227 |
| 2002/0065884 A1 * | 5/2002 | Donoho | ................ | H04L 67/306 |
| | | | | 709/224 |
| 2002/0087740 A1 * | 7/2002 | Castanho | ............ | G06Q 10/107 |
| | | | | 719/318 |
| 2002/0090934 A1 * | 7/2002 | Mitchelmore | .......... | H04L 67/02 |
| | | | | 455/412.2 |
| 2003/0110262 A1 * | 6/2003 | Hasan | ..................... | H04L 67/34 |
| | | | | 709/226 |
| 2003/0131073 A1 * | 7/2003 | Lucovsky | ............. | H04L 67/306 |
| | | | | 709/219 |
| 2003/0225683 A1 * | 12/2003 | Hill | ........................ | G06Q 10/06 |
| | | | | 705/37 |
| 2004/0002972 A1 * | 1/2004 | Pather | ..................... | G06F 9/542 |
| 2004/0078464 A1 * | 4/2004 | Rajan | ..................... | G06Q 30/02 |
| | | | | 709/224 |
| 2005/0027741 A1 * | 2/2005 | Eichstaedt | .......... | H04L 12/1895 |
| 2005/0144266 A1 * | 6/2005 | Antonelli | ................ | H04L 67/55 |
| | | | | 709/223 |
| 2008/0162308 A1 * | 7/2008 | Sharma | ................ | G06Q 10/087 |
| | | | | 705/28 |
| 2014/0075004 A1 * | 3/2014 | Van Dusen | ....... | G06F 16/90335 |
| | | | | 709/223 |
| 2015/0346942 A1 * | 12/2015 | Oren | .................... | G06F 3/04847 |
| | | | | 715/769 |
| 2016/0048936 A1 * | 2/2016 | Perkowski | ........... | G06Q 10/063 |
| | | | | 705/310 |
| 2016/0350886 A1 * | 12/2016 | Jessen | ................... | G06Q 50/184 |
| 2016/0360116 A1 * | 12/2016 | Penha | ................ | H04N 1/00204 |
| 2017/0075877 A1 * | 3/2017 | Lepeltier | ............... | G06F 40/117 |
| 2017/0154022 A1 * | 6/2017 | Wang | .................... | G06F 3/0482 |
| 2017/0315979 A1 * | 11/2017 | Boucher | ............... | G06Q 10/101 |
| 2018/0335901 A1 * | 11/2018 | Manzari | ................ | G06F 3/0485 |
| 2021/0286510 A1 * | 9/2021 | Tyler | ..................... | G06F 3/0486 |
| 2021/0342526 A1 * | 11/2021 | Rautenbach | .......... | G06F 40/197 |
| 2022/0269851 A1 * | 8/2022 | DeNeui | ................ | G06F 21/6218 |
| 2022/0319219 A1 * | 10/2022 | Tsibulevskiy | ........... | G06F 18/40 |

FOREIGN PATENT DOCUMENTS

| | | |
|---|---|---|
| CN | 104462036 A1 | 3/2015 |
| CN | 107066428 A | 8/2017 |
| CN | 107656930 A | 2/2018 |
| CN | 109543163 A | 3/2019 |
| CN | 110502488 A | 11/2019 |
| CN | 110909521 A | 3/2020 |
| CN | 111858518 A | 10/2020 |
| EP | 3018578 A | 5/2016 |

OTHER PUBLICATIONS

How does Word reference Excel data and keep it up to date, https://www.baidu.com/, dated 2023, 8 pages.
Chinese Office Action, issued in Chinese patent application No. 202110227846.9, dated Jul. 26, 2023, 18 pages (translation enclosed).
ROAMEDIT: "008 Blockquotes and Block Embeddings", Bilibili, (Search Date Apr. 20, 2022), Retrieved from URL:bilibili.com/video/BV1154y1C7fr/?spm_id_from=333.337.search-card.all.click, Sep. 11, 2020, 1 Page.

* cited by examiner

DOCUMENT PROCESSING METHOD FOR ONLINE COLLABORATION AND APPARATUS, AND DEVICE AND MEDIUM

This application claims priority to Chinese patent application No. 202110227846.9 filed with the China National Intellectual Property Administration (CNIPA) on Mar. 1, 2021, the disclosure of which is incorporated herein by reference in its entirety.

TECHNICAL FIELD

The present disclosure relates to the technology of computer document data processing, for example, a document processing method and apparatus, a device and a medium.

BACKGROUND

At present, people extensively use computer software for document processing. With the increasing requirements for collaborative office, the technology of document online collaborative processing has been gradually developed.

A document which is collaboratively processed online may need to satisfy complex requirements of multiple users such as viewing, editing or mutual quotation of content. How to effectively manage multiple operations of multiple users and maintain the accuracy and consistency of the document is one of the research directions in the related art.

SUMMARY

Embodiments of the present disclosure provide a document processing method and apparatus, a device and a medium so that a document which is collaboratively processed online can satisfy multiple operational requirements.

In a first aspect, an embodiment of the present disclosure provides a document processing method. The method includes that: an editing event of a user for a selection area content block within a selection area range of a current edited document is acquired, where the selection area content block includes at least two content sub-blocks, the selection area content block is content quoted from a source document to a target document, and the current edited document is the source document or the target document; and a synchronous content change is performed on a content block within the selection area range in the source document and a content block within the selection area range in the target document according to the editing event.

In a second aspect, an embodiment of the present disclosure further provides a document processing method based on a tree structure. The method includes that: an editing event of a user for a selection area content block within a selection area range of a current edited document is acquired, where the selection area content block includes at least two content sub-blocks; and at least one of a parent-child relationship between nodes or a node is updated in a tree structure corresponding to the current edited document according to the editing event. The tree structure includes a document node and content block nodes, the document node corresponds to a document, the content block nodes correspond to content blocks, a parent-child relationship between multiple nodes represents a belonging relationship in the current edited document, a parent-child relationship exists between a selection area node of the selection area content block and respective content block nodes of the at least two content sub-blocks and is used for representing a belonging relationship.

In a third aspect, an embodiment of the present disclosure further provides a document processing apparatus. The apparatus includes an editing event acquisition module and a content update module.

The editing event acquisition module is configured to acquire an editing event of a user for a selection area content block within a selection area range of a current edited document, where the selection area content block includes at least two content sub-blocks, the selection area content block is content quoted from a source document to a target document, and the current edited document is the source document or the target document.

The content update module is configured to perform a synchronous content change on a content block within the selection area range in the source document and a content block within the selection area range in the target document according to the editing event.

In a fourth aspect, an embodiment of the present disclosure further provides a document processing apparatus based on a tree structure. The apparatus includes an editing event acquisition module and a tree structure update module.

The editing event acquisition module is configured to acquire an editing event of a user for a selection area content block within a selection area range of a current edited document, where the selection area content block includes at least two content sub-blocks.

The tree structure update module is configured to update at least one of a parent-child relationship between nodes or a node in a tree structure corresponding to the current edited document according to the editing event.

The tree structure includes a document node and content block nodes, the document node corresponds to a document, the content block nodes correspond to content blocks, a parent-child relationship between multiple nodes represents a belonging relationship in the current edited document, a parent-child relationship exists between a selection area node of the selection area content block and respective content block nodes of the at least two content sub-blocks and is used for representing a belonging relationship.

In a fifth aspect, an embodiment of the present disclosure further provides a document processing device. The device includes at least one processor and a memory configured to store at least one program.

The at least one program, when executed by the at least one processor, causes the at least one processor to perform the document processing method provided in the embodiment of the first aspect of the present disclosure or the document processing method based on a tree structure provided in the embodiment of the second aspect of the present disclosure.

In a sixth aspect, an embodiment of the present disclosure further provides a computer storage medium storing a computer program, where the computer program, when executed by a processor, performs the document processing method provided in the embodiment of the first aspect of the present disclosure or the document processing method based on a tree structure provided in the embodiment of the second aspect of the present disclosure.

DETAILED DESCRIPTION

Figure 1:
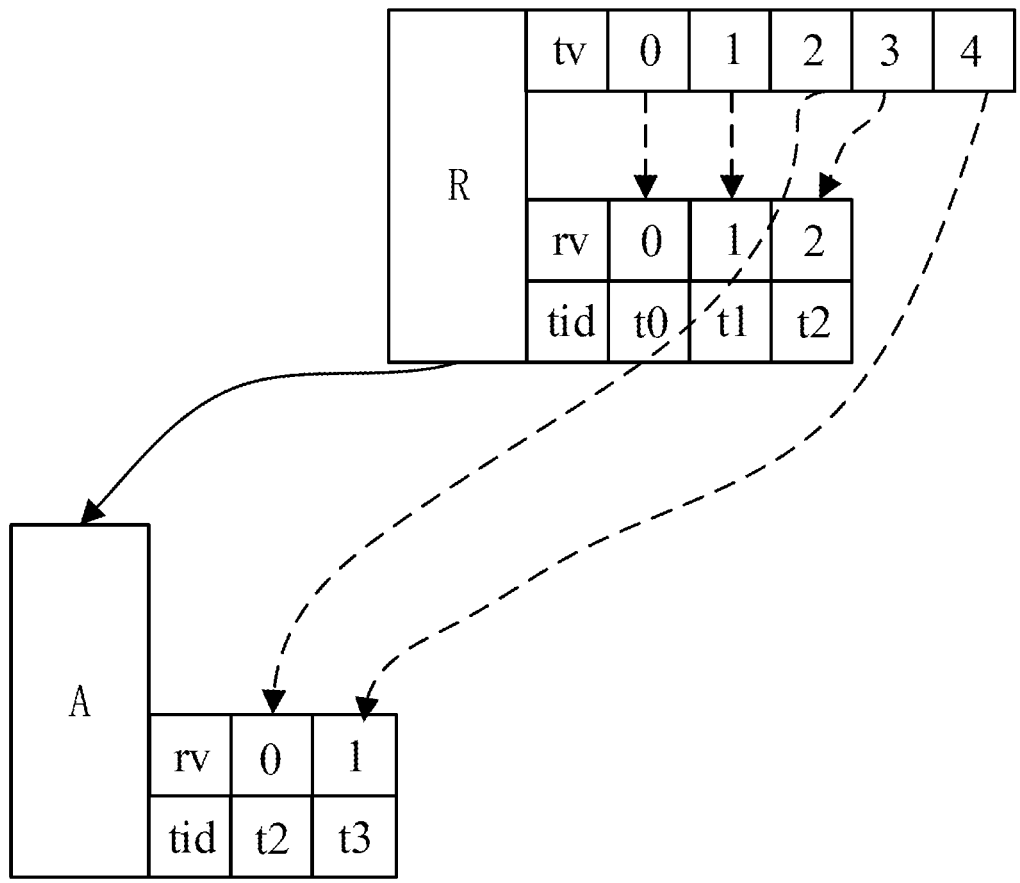
FIG. 1 is a diagram showing a tree structure of a document according to an embodiment of the present disclosure.

Embodiments of the present disclosure are described in more detail hereinafter with reference to the drawings. Although some embodiments of the present disclosure are shown in the drawings, it is to be understood that the present disclosure may be implemented in various forms and should not be construed as limited to the embodiments set forth herein; conversely, these embodiments are provided so that the present disclosure will be thoroughly and completely understood. It is to be understood that the drawings and embodiments of the present disclosure are merely illustrative and are not intended to limit the scope of the present disclosure.

It should be understood that various steps recited in the method embodiments of the present disclosure may be performed in a different order and/or in parallel. Additionally, the method embodiments may include additional steps and/or omit some of the illustrated steps. The scope of the present disclosure is not limited in this respect.

The term "includes" or its variant used herein means "includes, but is not limited to". The term "based on" means "at least partially based on". The term "an embodiment" means "at least one embodiment". The term "another embodiment" means "at least another embodiment". The term "some embodiments" means "at least some embodiments". Definitions of other terms are given in the description hereinafter.

It is to be noted that concepts such as "first" and "second" mentioned in the present disclosure are used for distinguishing between apparatuses, between modules or between units and are not intended to limit the order or mutual dependence of the functions performed by these apparatuses, modules or units.

It is to be noted that "one" and "multiple" mentioned in the present disclosure are not limiting but illustrative. It is to be understood by those skilled in the art that "one" and "multiple" are construed as "at least one" unless otherwise specified in the context.

Embodiments of the present disclosure are applicable to the processing of online documents and may be executed by a document processing apparatus, which may be implemented by hardware and/or software. The apparatus may be configured in an electronic device with storage and computing capabilities. For example, the apparatus may be integrated in a server side, and the server side processes an online document to respond to editing operations of the user on the online document through a client. Optionally, the apparatus is applicable to the scenario where the server side provides services, such as editing and viewing of an online document, for multiple clients. Entity content of the document is stored in the server side. This apparatus may also be configured in the client; or the client and the server side cooperate to process the document.

To clearly introduce technical solutions of embodiments of the present disclosure, the document and content blocks applicable to the embodiments of the present disclosure are first introduced. Information such as identifiers and versions of the document and content blocks and belonging relationships and quotation relationships between the document and the content blocks may be recorded in multiple forms, for example, in the form of a tree structure, which is not limited in the embodiments of the present disclosure.

A document (page) may include document content in various forms, for example, various types of multimedia entity content such as text, images, tables, links and tables. The entity content all belongs to the document. To facilitate the quotation of certain entity content in multiple places, the entity content is separated into content blocks, so that the entity content can be easily quoted by other documents or content blocks in units of content blocks. A content block is a piece of data that has independently collaborative and recordable capabilities. The quotation relationship refers to the relationship in which a source content block in a source document is quoted by other target documents or target content blocks. In a target document or a target content block, the content of the source content block may be copied, and the quotation relationship may be optionally displayed to the user with or without a tag. The definition of the content block may be preset by online document software or customized by the user. For example, content blocks may be distinguished based on content types, for instance, text, images, tables and the like are different types of content; content blocks may be distinguished based on preset separators such as a "carriage return", a "paragraph separator" and a "section break"; or content blocks may be distinguished by separation boundaries between content blocks set by the user.

Embodiments of the present disclosure provide a selection area content block. The selection area content block is a special block including at least two content sub-blocks, which can facilitate the user to perform operations with multiple content blocks as objects. In this manner, front-end processing functions are enriched, and the back-end processing efficiency is optimized. Illustration is made through embodiments below.

Embodiment One

Figure 2:
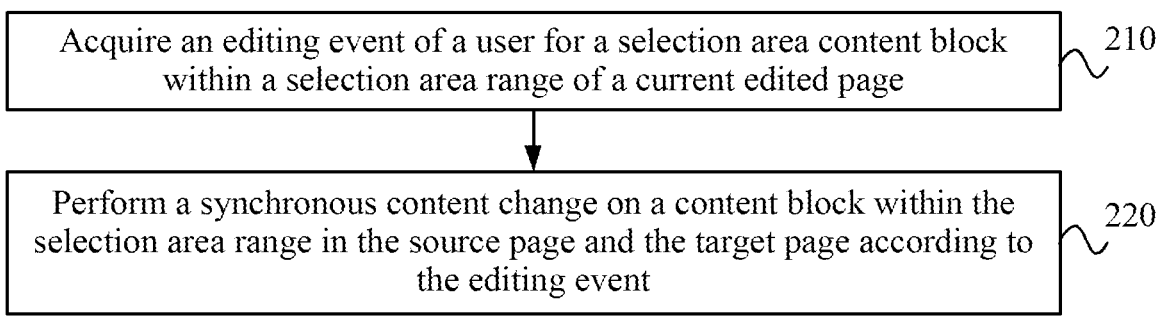
FIG. 2 is a flowchart of a document processing method according to embodiment one of the present disclosure.

FIG. 2 is a flowchart of a document processing method according to embodiment one of the present disclosure. The embodiment is performed by a document processing apparatus implemented in hardware and/or software. The apparatus may optionally be an application client and may be configured in an electronic device terminal of a user. Of course, the apparatus may also be implemented through webpages. A client in the manner of an application or a webpage can achieve document processing through collaboration with a server side.

As shown in FIG. 2, the method includes the following.

In S210, an editing event of a user for a selection area content block within a selection area range of a current edited document is acquired, where the selection area content block includes at least two content sub-blocks, the selection area content block is content quoted from a source document to a target document, and the current edited document is the source document or the target document.

The current edited document is a document which the user opens and performs an editing operation on in the client. The selection area content block includes at least two content sub-blocks, and positions of the at least two content sub-blocks may be consecutively set or spaced apart. The area length and the content type of the content sub-blocks are not limited. The user may select multiple content sub-blocks and then create a selection area content block by performing a set operation such as clicking on a right-click menu option or using a shortcut key.

The created selection area content block may be retained in the source document, or may be presented in the target document through quotation, that is, the selection area content block is content quoted from the source document to the target document. The current edited document may be the source document where the selection area content block is located, or may be the target document where the selection area content block is located. The source document and the target document may be different documents or the same document. For example, in the same document, if a selection area content block at one position is quoted to another position, the document is both the source document and the target document of the selection area content block. The one position may be referred to as a source position, and the another position may be referred to as a target position. That is, the position in the source document where the content block is located before being quoted may be referred to as a source position, and the content block is quoted to a target position of the target document after being subjected to a quotation operation.

The selection area content block has a corresponding selection area range, which is generally the sum of position ranges occupied by multiple content sub-blocks in the document. If the content sub-blocks within the selection area range are consecutively set, position information of the selection area range may include start position information of the selection area range and end position information of the selection area range. Alternatively, position information of the selection area range may be recorded through absolute coordinate values or relative coordinate values in the document.

The selection area range may be in units of coordinate values or characters of content blocks, and optionally, may be in units of lines in the document, which is convenient for the user to perform operations within a selection area range of certain lines and is more suitable for editing habits of the user for the document.

In S220, a synchronous content change is performed on a content block within the selection area range in the source document and a content block within the selection area range in the target document according to the editing event.

An editing operation on the selection area content block within the selection area range may be applied to a content block in the source document and a content block in the target document, that is, a synchronous update can be performed. For example, newly adding a content sub-block or deleting a content sub-block is performed in both the source document and the target document.

That the synchronous content change is performed on the content block within the selection area range in the source document and the content block within the selection area range in the target document according to the editing event may include the following.

A content update is performed on the content block within the selection area range in the current edited document according to the editing event.

In response to the current edited document being the source document, a server side is notified of the editing event or updated content of the selection area content block in the current edited document so that the server side is requested to perform a synchronous change on a selection area content block in at least one target document which quotes the selection area content block; in response to the current edited document being the target document, a server side is notified of the editing event or updated content of the selection area content block in the current edited document so that the server side is requested to perform a synchronous change on the selection area content block in the source document where the selection area content block is located and a selection area content block in another target document which quotes the selection area content block.

Through the preceding operation process, the content update may first be performed on the current edited document, and then the server side is notified so that the server side notifies other corresponding clients of the updated content of the selection area content block for performing the synchronous update. For example, if the current edited document is the source document, the server side notifies performing the update to a client of at least one target document which quotes the selection area content block. If the current edited document is the target pate, the server side notifies performing the update to a client of the source document where the selection area content block is located and a client of another target document which quotes the selection area content block.

According to the technical solutions of the embodiment, the selection area content block is set, and the user is allowed to perform the editing operation with the selection area content block as an edited object within the selection area range. The editing operation may be referred to as an overall operation on the selection area content block, so that the source document and the target document can be synchronously updated for the overall selection area content block. In this manner, the following situation is avoided: in a case where various content sub-blocks are independent from each other, only a separate content sub-block can be operated as an edited object; for example, an operation of newly adding a content sub-block cannot cause the automatic generation of a quotation relationship. Thus, the synchronous update of the source document and the target document cannot be achieved, resulting in complex and inconvenient operations of the user. When the function of the selection area content block is set, if the user performs operations within the selection area range of the target document, it may be considered that the selection area content block is taken as an operation object, and the selection area content block in the source document can be updated in sync with the target document. If the user modifies the selection area content block in the source document to move the modified content outside the selection area range, it may be considered that the user does not want the modified content to be quoted as the selection area content block, and therefore, the content outside the selection area range is no longer retained in the target document.

Embodiment Two

Figure 3A:
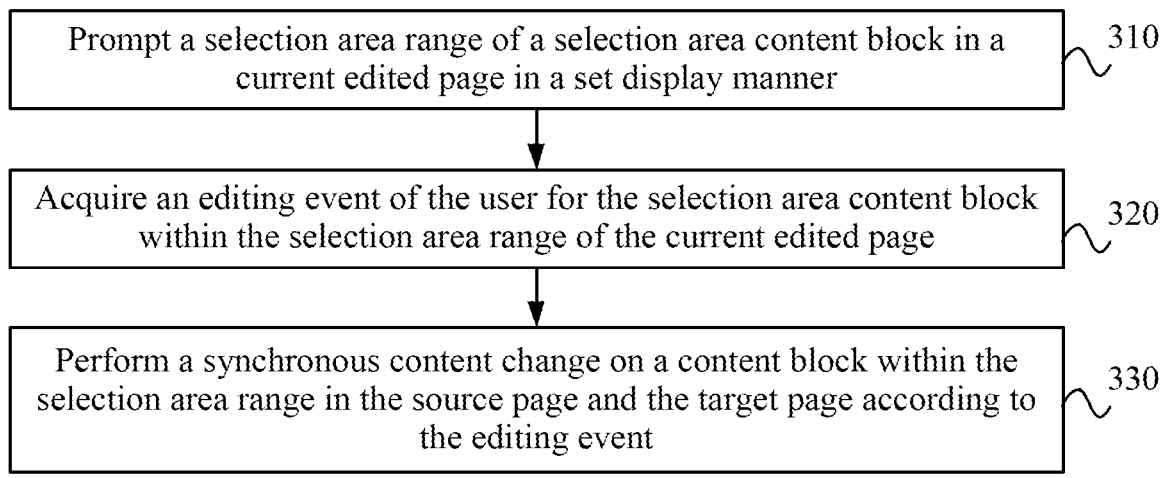
FIG. 3A is a flowchart of a document processing method according to embodiment two of the present disclosure.

FIG. 3A is a flowchart of a document processing method according to embodiment two of the present disclosure. The embodiment illustrates technical solutions for effect presentation of a selection area content block in a document based on the preceding embodiment. The method includes the following.

In S310, a selection area range of a selection area content block in a current edited document is prompted in a set display manner.

The set display manner includes displaying a boundary line on an upper boundary of the selection area range and a boundary line on a lower boundary of the selection area range, or displaying the selection area range in a set background color, set transparency or a set layout style.

Figure 3B:
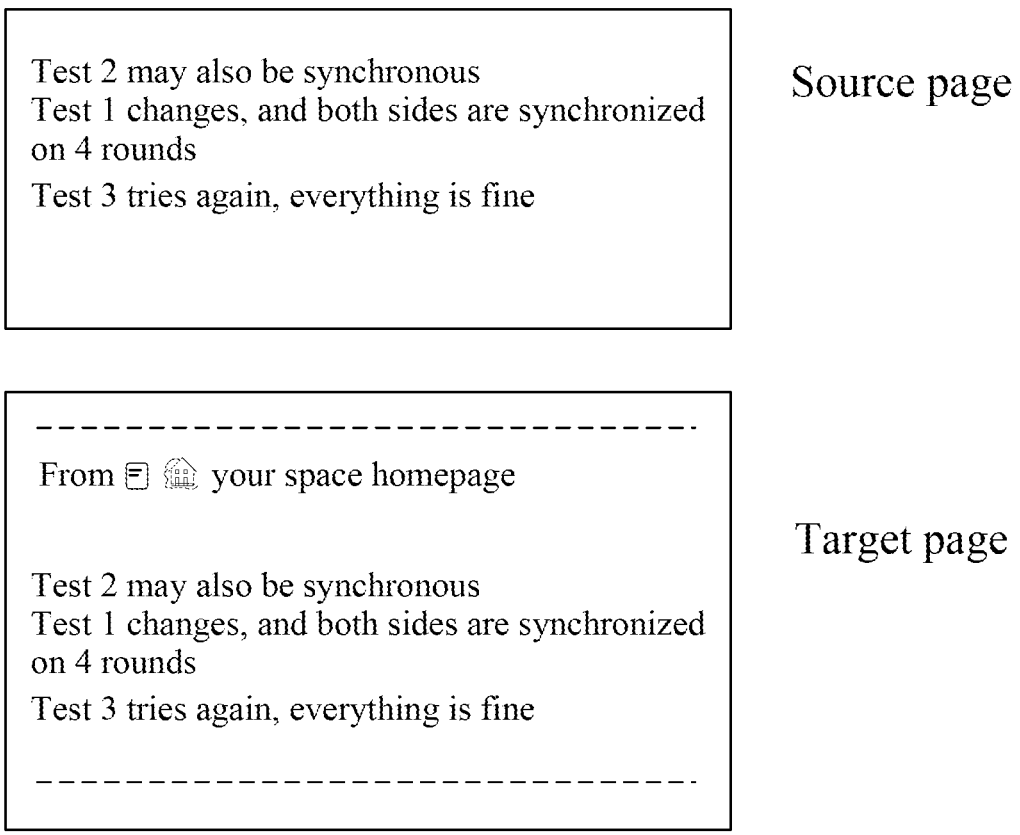
FIG. 3B is a diagram showing an interface of a document applicable to embodiments of the present disclosure.

To enable a user to visually see the selection area range and facilitate knowing which editing events are within the selection area range and which editing events are outside the selection area range, the selection area range may be distinctively displayed. There are multiple manners for distinctively displaying the selection area range. If the selection area range includes consecutive content sub-blocks, boundary lines may be displayed on the upper boundary and the lower boundary of the selection area range respectively. For example, a dashed line is displayed above a start line of a start content sub-block, and a dashed line is displayed below a tail line of a tail content sub-block. As shown in FIG. 3B, the upper half represents the presentation effect of a source document, and the lower half represents the presentation effect of a target document. The boundary prompt of the selection area range may be performed only in the target document which quotes the selection area content block, or may be performed in both the source document and the target document. In the target document, optionally, information of the selection area content block may further be displayed in the source document to indicate the source.

In S320, an editing event of the user for the selection area content block within the selection area range of the current edited document is acquired, where the selection area content block includes at least two content sub-blocks, the selection area content block is content quoted from the source document to the target document, and the current edited document is the source document or the target document.

The preceding prompt of the selection area range in the set display manner may be performed before the editing event is acquired, so that the user can perform operations within a clear selection area range. Alternatively, the prompt may be performed in the process of acquiring the editing event. For example, when the mouse hovers over the selection area range and the cursor enters the selection area range, it is indicated that the input of the editing event can be started, and then the selection area range is prompted in the set display manner.

Optionally, during acquiring the editing event of the user for the selection area content block within the selection area range of the current edited document, the method may further include the following.

An update result obtained after the selection area content block is updated through the editing event is prompted in a set preview manner in the current edited document.

Through the preceding operation, a result of the editing operation of the user on the selection area content block is presented to the user in a preview manner so that which content blocks may be affected by this editing operation are prompted to the user.

The update result may include deletion of a content sub-block, movement of a content sub-block or new addition of a content sub-block. There may be multiple preview prompt manners. For example, deleting a content sub-block or newly adding a content sub-block may be displayed in a semi-transparent state; which content sub-blocks within the selection area range will be affected may be prompted in manners such as highlighting, a resident prompt and hovering in the selection area range; or an update, an update time and an update author of the selection area content block may be prompted to the user in the target document which performs quotation.

For example, when content of a content sub-block is moved within the selection area range, a prompt line for an insertion position of the content is displayed as the content is moved. When the prompt line is located between the upper boundary of the selection area range and the lower boundary of the selection area range, exemplarily, the prompt line is located between the lower boundary of the selection area range and a tail content sub-block, it is considered that an order adjustment within the selection area range is performed, and the order of the selection area content blocks after the movement may be synchronously displayed in both the source document and the target document, as shown in FIG. 3B.

In S330, a synchronous content change is performed on a content block within the selection area range in the source document and a content block within the selection area range in the target document according to the editing event.

According to the technical solutions of the embodiment, exemplarily, before, during and after the process that the selection area content block is edited, the selection area range and a selection area result are prompted, which facilitates the unified operation of the user on the selection area content block and avoids an incorrect operation of the user.

An optional example of dragging a content sub-block is described below. In the example, that the editing event that the user deletes a content sub-block within the selection area range of the current edited document is acquired may include the following.

A dragging operation performed by the user on a content sub-block within the selection area range is acquired, and the dragging operation is recognized as the editing event.

The preceding dragging operation may be selecting and dragging at least one content sub-block within the selection area range based on the mouse or other control means to change the position of the at least one content sub-block. An end position after dragging may be located within or outside the selection area range.

According to the preceding solution, optionally, that the dragging operation is recognized as the editing event includes the following.

An event type of the editing event is recognized based on the end position of the dragging operation.

The content block within the selection area range in the source document and the target document is updated based on the recognized event type.

In the preceding operations, different end positions after dragging may lead to different event types of the editing event, which may result in different document processing effects.

Optionally, that the event type of the editing event is recognized based on the end position of the dragging operation includes at least one of the following.

When the end position of the dragging operation is located outside the selection area range, the dragging operation is recognized as deleting a dragged content sub-block.

When the end position of the dragging operation is located inside the selection area range, the dragging operation is recognized as adjusting a display position of a dragged content sub-block.

When a content sub-block is dragged outside the selection area range, it is indicated that the editor wants to delete the content sub-block from the selection area content block. When a content sub-block is dragged inside the selection area range, it is indicated that the editor still wants to retain the content sub-block within the selection area content block, and what needs to be changed is the display position of the content sub-block.

According to the technical solutions of the preceding embodiment, the method may further include the following.

Boundary information of the selection area range is displayed, and an end position prompt identifier of the dragging operation is displayed when the dragging operation is performed; and whether the end position of the dragging operation is located within the selection area range is determined based on a position relationship between the end position prompt identifier and the boundary information at an end of the dragging operation.

Therefore, the document processing effect generated after the dragging operation is ended may be prompted to the user so that an incorrect operation is avoided.

An optional example of a typical splitting operation may include the content described below.

That the editing event that the user splits a content sub-block within the selection area range of the current edited document may include that: an operation that the user splits a tail content sub-block within the selection area range is acquired, and the splitting operation is recognized as the editing event. Correspondingly, that the synchronous content change is performed on the content block within the selection area range in the source document and the target document according to the editing event may include the following.

If the current edited document is the source document, and a newly established content sub-block after the splitting operation is located outside the selection area range, the newly established content sub-block is deleted from the selection area content block in the source document; and a tail content sub-block of the selection area content block in the target document is split, and a content sub-block which is within the selection area range is retained.

If the current edited document is the target document, the selection area range in the target document and the selection area range in the source document are both updated to retaining a newly established content sub-block after the splitting operation.

In other words, when the splitting operation is performed on a tail content sub-block of the selection area content block, if the splitting operation is performed at a source position of the selection area content block, a first half of content obtained after the tail content sub-block is split is displayed at a target position which quotes the selection area content block and a second half of content obtained after the tail content sub-block is split is not displayed; and/or, if a tail content sub-block is split at a target position which quotes the selection area content block, a first half of content obtained after splitting and a second half of content obtained after splitting are displayed at both a source position and the target position.

The editing event during the document processing process may include multiple types, and optionally, may include at least one of the following.

A content sub-block is newly added within the selection area range.

A content sub-block is deleted within the selection area range.

Content of a content sub-block is changed within the selection area range.

An order of two or more content sub-blocks is changed within the selection area range.

Of course, the editing event is not limited to the above. For example, the editing event may further include moving the selection area content block within the selection area range as a whole.

Various types of editing events are illustrated through examples below.

The editing event that a content sub-block is newly added within the selection area range may be that the user input or paste copied content within the selection area range to generate a new content sub-block. According to creation rules of content blocks, an original content sub-block may be split into two content sub-blocks through a "carriage return" operation or other operations. Since the editing operation is performed within the selection area range, the newly added content sub-block may also be taken as a part of the selection area content block and include a quotation relationship with the target document, and thus the user does not need to re-establish the quotation relationship between the newly added content sub-block and the target document.

Figure 4:
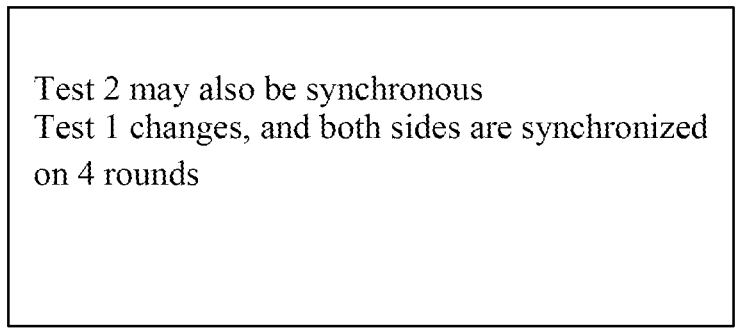
FIG. 4 is a diagram showing another interface of a document applicable to embodiments of the present disclosure.
Figure 4:
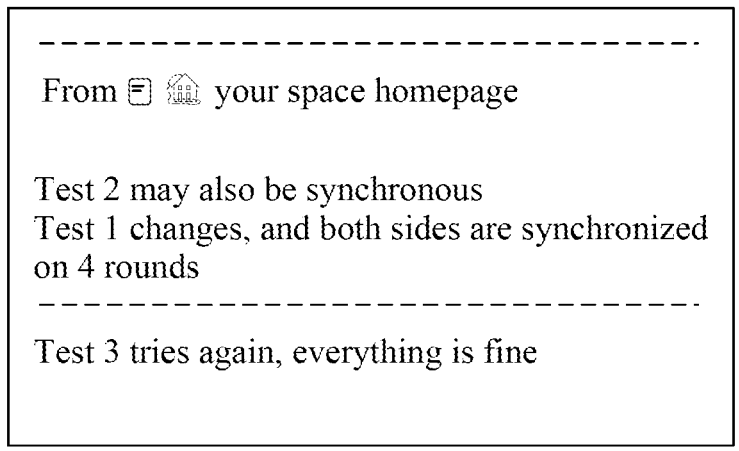

The editing event that a content sub-block within the selection area range is deleted may be that the user directly deletes a certain content sub-block within the selection area range, and optionally may include that: an operation that the user drags a content sub-block within the selection area range outside the selection area range is acquired as the editing event. As shown in FIG. 4, the upper half shows the presentation effect of the source document, and the lower half shows the presentation effect of the target document. When the user drags a content sub-block within the selection area range outside the selection area range, it is indicated that the content sub-block is only retained in the current edited document but is deleted from the selection area range. Therefore, in the target document having a quotation relationship, the deleted content sub-block is not retained in the selection area range. As shown in FIG. 4, if a prompt line is moved blow a lower boundary line of the selection area, it is considered that the moved content block is deleted from the selection area content block. Content sub-block "test 3" is deleted from the target document, and then content sub-block "test 3" within the selection area range of the source document is eliminated. Similarly, if a content sub-block in the source document is dragged outside the selection area range, the deletion effect is also generated in the target document.

The editing event that content of a content sub-block within the selection area range is changed may be directly changing content of a certain content sub-block.

The editing event for the selection area content block may further include moving the selection area content block within the selection area range as a whole. This editing event is an operation that takes the selection area content block as an object. At this time, in the current edited document, the selection area range can be updated accordingly, but content of the selection area content block is not updated. The corresponding content in the selection area range in the source document and the corresponding content in the selection area range in the target document are not changed.

In some embodiments, a document corresponds to a tree structure, and the server side manages the document through the tree structure. Tree structures of multiple documents may be combined to each other through quotation and other association relationships. FIG. 1 is a diagram showing a tree structure of a document according to an embodiment of the present disclosure. Referring to FIG. 1, a simple tree structure of a document is illustrated. The document includes two content blocks. One is a root content block, and the other one is an another non-root-node content block. The root content block refers to basic content generated when the document is created, and one document may have only one root content block. The another content block is a non-root content block belonging to the document, and may be a content block generated with the root content block based on a template when the document is created, or may be a content block added by the user after the document is created. As shown in FIG. 1, the tree structure includes two types of nodes, that is, a document node and a content block node. The document node (node R) corresponds to the document and also corresponds to the root content block of the document. The content block node (node A) corresponds to content block A.

In the tree structure, a parent-child relationship between the document node and the content block node represents a belonging relationship between the document and the content block. That is, a parent node of node A is node R, a child node of node R is node A, and a parent-child relationship exists between node A and node R.

The document node records a document version identifier sequence, and the content block node records a content block version identifier sequence. A document version identifier is used for representing the update of each content block belonging to the document. As shown in FIG. 1, node A includes the content block version identifier sequence, that is, a Record Version (RV) sequence. A content block version identifier is also referred to as a Record Version (RV) and is used for recording each version in which content of a content block is changed. The content blocks belonging to the document include a root content block, and the document node further records a content block version identifier sequence of the root content block. If node R includes the root content block, node R may further include an RV sequence. Of course, if the document node does not include the root content block and takes a basic content block also as a content block sub-node, the document node may not include an RV sequence. As shown in FIG. 1, the document node further records the document version identifier sequence, that is, a transform version (TV) sequence. A TV is used for representing the update of each content block belonging to the document. For example, a newly added RV of each content block node may lead to a newly added TV.

In the tree structure, an editing operation identifier (that is, a transaction identifier (TID)) may further be recorded. An editing operation represents a transaction operation, and the transaction operation may lead to a change in content of a content block or other changes in the tree structure. As shown in FIG. 1, optionally, the document node and the content block node further record an editing operation identifier sequence. An editing operation identifier is used for representing an editing operation of updating a content block. TVs may be recorded in one-to-one correspondence with RVs of each node; or when an editing operation causes changes in RVs of multiple content blocks, one TV may record multiple RVs corresponding to one TID.

In the tree structure, a table recording a tree structure snapshot may be recorded. That is, for each TV, latest RVs of all content blocks of the document in the TV state are recorded. The tree structure snapshot may also record a newly added RV corresponding to the TV.

The node of the tree structure not only records the relationship between the content block and the document and version changes, but also correspondingly records entity content of the content block. Each content block node may correspondingly record a change in entity content of a content block in each RV relative to a previous RV. Increased entity content of each version of a content block and entity content of the latest version of the content block may be stored corresponding to node identifiers and version identifiers for easy reading.

Embodiment Three

Figure 5:
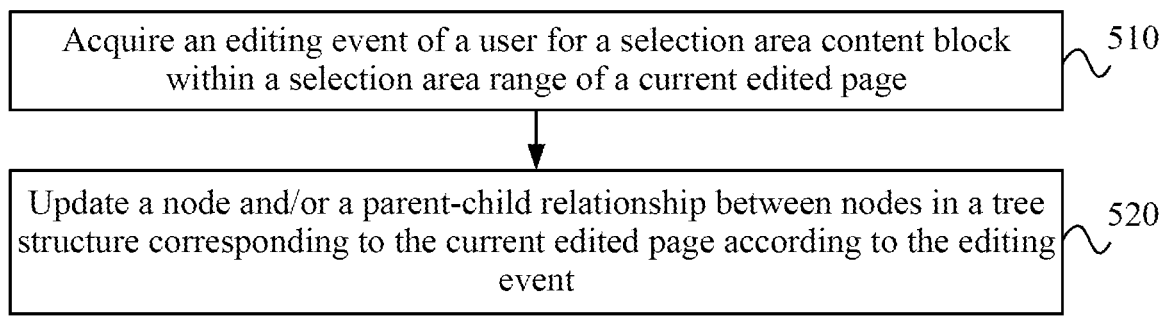
FIG. 5 is a flowchart of a document processing method based on a tree structure according to embodiment three of the present disclosure.

FIG. 5 is a flowchart of a document processing method based on a tree structure according to embodiment three of the present disclosure. The embodiment introduces the support function for a selection area content block in a document based on a tree structure. The method may be executed by a document processing apparatus based on a tree structure, which may be implemented in hardware and/or software and may be configured in an electronic device such as a user terminal device or a server side device. The pace processing method based on a tree structure and the document processing method provided in the preceding embodiments may cooperate with each other so that functions of a selection area content block in a document are achieved.

As shown in FIG. 5, the method includes the following.

In S510, an editing event of a user for a selection area content block within a selection area range of a current edited document is acquired, where the selection area content block includes at least two content sub-blocks.

Reference may be made to meanings of the document, the content block, the selection area content block and the editing event which are introduced in the preceding embodiments, which is not repeated here. When a client acquires the editing event of the user, the editing event may be processed locally in the client, or may be transmitted to a server side for processing. For a document which is collaboratively processed online, the server side may store the content of the document and a tree structure of the document in a centralized manner; therefore, when opening the document, the client can download data of the document and the tree structure of the document from the server side for local operations. When the user opens the document through different clients or loads the same content block through different documents, consistent content and tree structures can be acquired from the server side.

In S520, a node and/or a parent-child relationship between nodes are updated in a tree structure corresponding to the current edited document according to the editing event.

The tree structure includes a document node and content block nodes, the document node corresponds to the current edited document, the content block nodes correspond to content blocks, a parent-child relationship between multiple nodes represents a belonging relationship in the current edited document, a parent-child relationship exists between a selection area node of the selection area content block and respective content block nodes of the content sub-blocks and is used for representing a belonging relationship.

In the embodiment, a special-purpose selection area node is set for the selection area content block in the tree structure of the document. The selection area node is a special type of content block node. The selection area node is configured to correspondingly record a parent node identifier of the selection area node and selection area range information.

As described above, a content block node is configured to correspondingly record entity content of a content block, a version identifier (an RV sequence) of a historical editing version of the content block and an operation identifier (a TID sequence) of a historical editing operation of the content block.

The document node is configured to correspondingly record entity content of a root content block of the document, a block version identifier (an RV sequence) of a historical editing version of the root content block and an operation identifier (a TID sequence) of a historical editing operation of the root content block, and is further configured to record a document version identifier (a TV sequence) of a historical editing version of the document.

A node is further configured to record a parent node identifier and/or a child node identifier.

Compared with an ordinary content block node, the selection area node further records the selection area range information. Moreover, the selection area node represents an included content sub-block, and the selection area content block does not have entity content, so that the selection area node may not correspondingly record entity content belonging to the document.

In the tree structure of the document, each node has a unique node identifier, a parent-child relationship exists between nodes, and each node records a node identifier of a parent node of the each node. Each node further records position information of a content node in the document. The position information may include coordinate values in the document or data of lines where the content block is located in the document, such as line 1 to line 3, which may be set according to editing requirements of the document. A parent node may record a child node array for recording node identifiers and position information of all child nodes of the parent node. For example, the document node is further configured to correspondingly record a position of a child node in the document.

A node may or may not record a node identifier of a child node of the node. For example, the selection area node may record a parent node identifier and a child node identifier of the selection area node to record that the selection area node belongs to which document and includes which content sub-blocks.

Alternatively, the selection area node may only record a parent node identifier of the selection area node and not record a child node identifier. When the selection area node needs to know the included child node, the selection area node may query, based on the selection area range information, which content block nodes are included by child nodes falling in the selection area range from a parent node to which the selection area node belongs.

In the preceding operations of the embodiment, if the editing event is located within the selection area range of the document, the selection area content block is taken as an object for the operations. Then, in the tree structure corresponding to the current edited document, a node and/or a parent-child relationship between nodes may be updated. For example, a parent-child relationship between a node of a content sub-block and the selection area node is added.

The selection area node may further be configured to record a block version identifier of a historical editing version of the selection area content block and an operation identifier of a historical editing operation of the selection area content block. An RV sequence and a TID sequence of the selection area node may record the overall update of the selection area content block. For example, when the position of the selection area content block is moved as a whole, the selection area range is updated, and then new versions of the TID sequence and the RV sequence of the selection area node are generated. The latest version of a content sub-block node corresponding to an RV of the selection area node may be recorded through a selection area node snapshot, and then the selection area node is taken as an object for the overall operation. Generally, when the selection area range of the selection area node or a parent element of the selection area range is changed, the RV of the selection area node changes, and a collaborative operation may be performed based on the RV of the selection area node. For example, when a quotation range is changed, other nodes having an association relationship with the selection area node are updated. Optionally, the RV may include two parts. One part is used for recording changes in the selection area range or the parent element of the selection area range, and the other part is used for recording changes in child nodes associated with the selection area node. Correspondingly, the preceding overall operation may be listening of updates, version rollback or other operations with the selection area content block as an object. In this manner, the server side can manage the document based on clearer logic, conflicts can be reduced, the listening efficiency of the server side can be improved, and data interaction costs can be reduced.

According to the technical solutions of the embodiment, the selection area content block is set, the user is allowed to perform centralized editing operations within the selection area range with the selection area content block as an edited object, so that the following situation is avoided: in a case where content sub-blocks are independent from each other, only a separate content sub-block can be operated as an edited object. The relationship between the selection area content block and the document and the relationship between the selection area content block and the content sub-block node are managed based on the selection area node of the tree structure, so that the logic relationship between nodes is clear, and unified operations are facilitated. The selection area content block may be taken as a whole, and a parent-child relationship between the selection area content block and the document node is updated in the tree structure.

Figure 6:
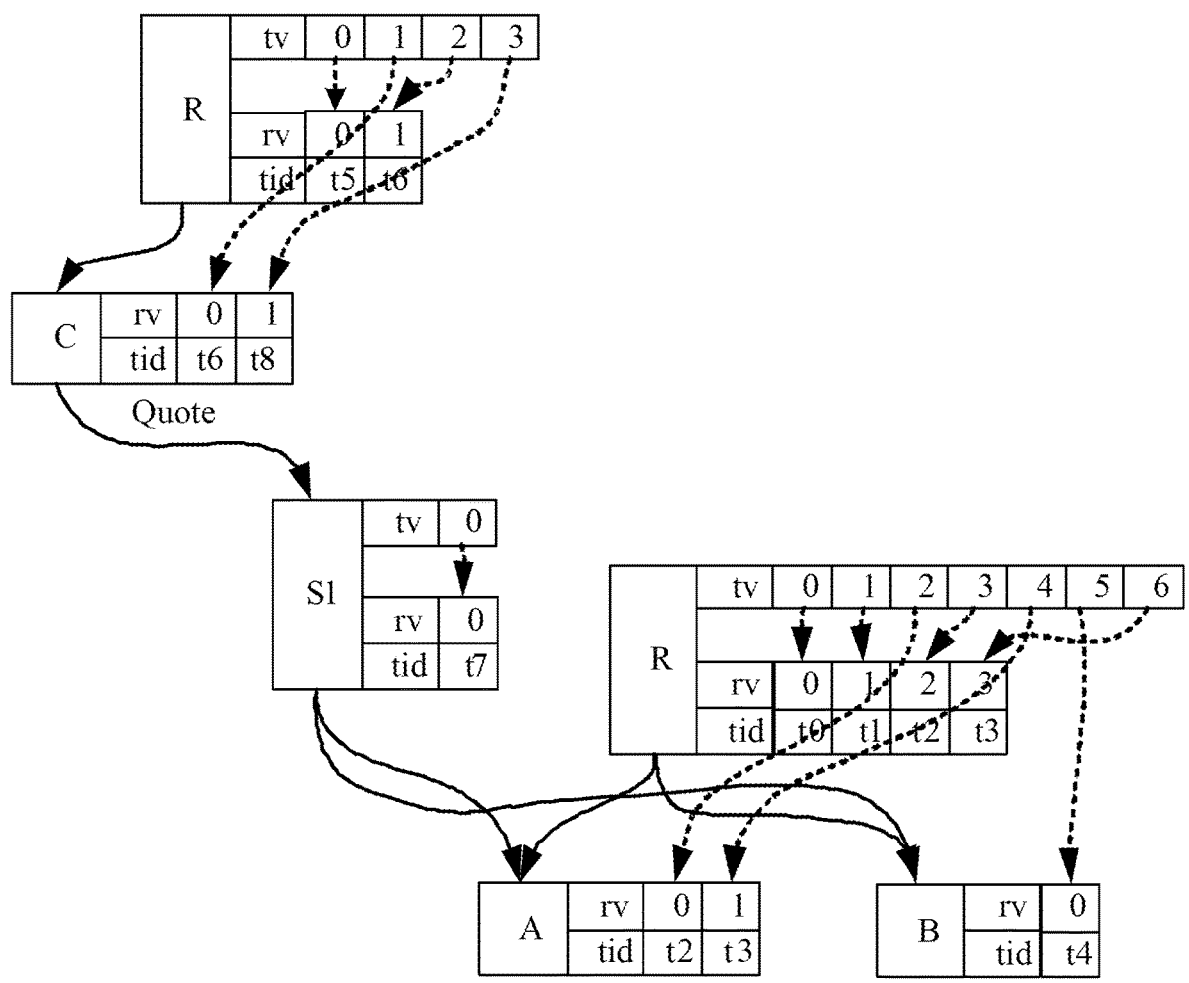
FIG. 6 is a diagram showing another tree structure of a document applicable to embodiments of the present disclosure.

The relationship between the selection area node and other nodes in the tree structure is illustrated in combination with FIG. 6 below. As shown in FIG. 6, the following nodes are provided: two document nodes, that is, document nodes R0 and R1, one selection area node, that is, selection area node S1, one quotation node, that is, quotation node C, and two content block nodes, that is, content block nodes A and B. Content block nodes A and B belong to document node R0. Content block nodes A and B are taken as child nodes of selection area node S1. The document of document node R0 is the source document of selection area node S1, and document node R1 is the quotation document of selection area node S1. That is, the document of document node R1 quotes a selection area content block including content sub-blocks A and B. The quotation relationship is represented by quotation node C of document node R1. Nodes A, B, S1 and C of content blocks each record a TID sequence and an RV sequence, and document nodes R0 and R1 each further record a TV sequence. In FIG. 6, a solid line between nodes represent a parent-child relationship between the nodes, and a dashed line represent a mapping relationship between a TV and a RV. Based on the selection area node, unified operations may be performed when multiple content blocks are quoted. For example, based on an editing operation of which the TID is t7, quotation relationships between document node R1 and content block nodes A and B can be deleted in one time. Similarly, in the case of a change within the selection area range and a collaborative mode jointly constructed for the content blocks, unified operations for selection area node S1 may be used, which is more convenient than operating a separate content block.

Figure 7:
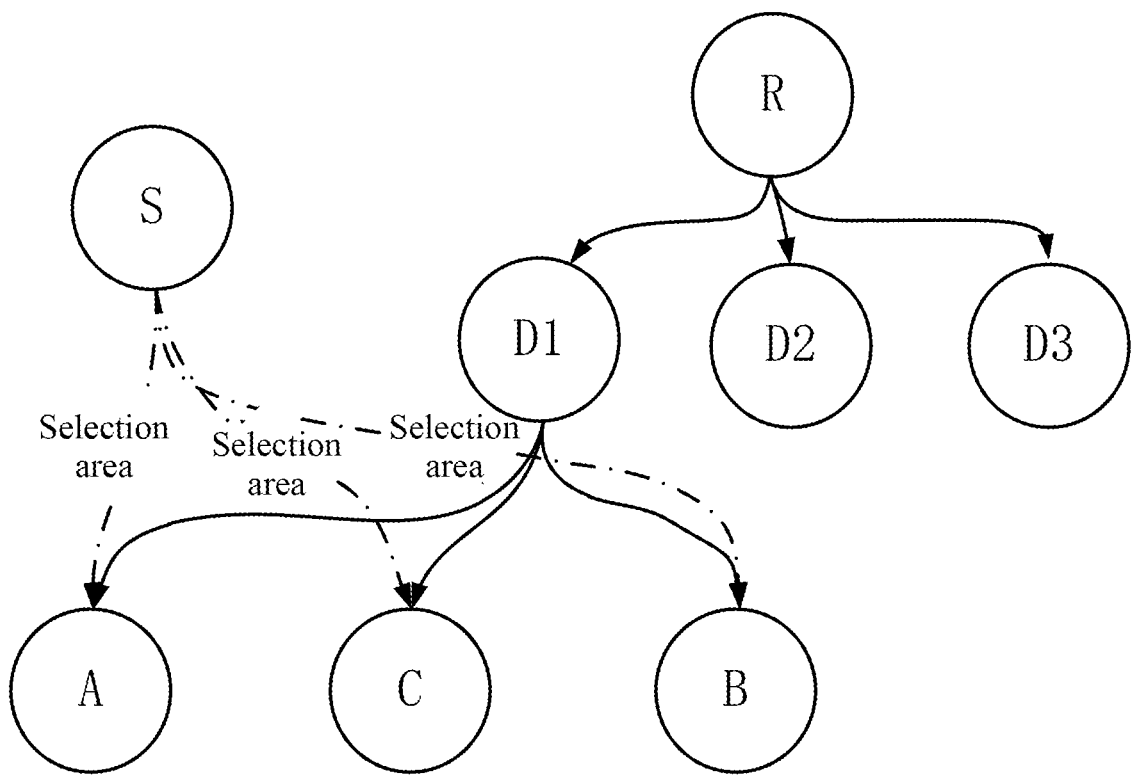
FIG. 7 is a diagram showing another tree structure of a document applicable to embodiments of the present disclosure.

In addition, a simplified tree structure shown in FIG. 7 is taken as an example. Document node R has three content block nodes D1, D2, and D3. Content block node D1 further includes content block nodes A and B. Content block nodes A and B form selection node S, which can be quoted by other documents. If node addition or deletion is performed on consecutive sibling nodes A and B, the selection area node needs to change synchronously. For example, if content block C is inserted between content blocks A and B in the source document, content block node C is added to the tree structure; and at the same time, sub-node C is added to the selection area node S. The target document can directly quote content block nodes A, C and B.

The content and recording manner of the selection area range information is illustrated in detail based on the preceding embodiments. The selection area range information of the selection area node represents positions of content sub-blocks of the selection area content block in the document. Positions of at least two content sub-blocks in the current edited document may be consecutive or spaced apart from each other. When content sub-blocks are consecutively set, the selection area range is a continuous overall region.

The selection area range information may include start position information of a selection area and end position information of the selection area.

Alternatively, the selection area range information may include node identifier information of the selection area content block included in the selection area node.

When the selection area range is recorded through a start position and an end position, the area between the start position and the end position may be calculated as the selection area range. If the selection area range is recorded through node identifiers, position information of the node identifiers may be queried from a parent node or child nodes so that the area range composed of these nodes is calculated.

Optionally, when the selection area range is recorded with lines in the document as the minimum unit, the start position information of the selection area range information and the end position information of the selection area range information are a start line of a start content sub-block and a tail line of a tail content sub-block. That is, an operation performed before a start line of a content sub-block and an operation performed after a tail line of a tail content sub-block are operations outside the selection area range.

Alternatively, the start position information of the selection area range information and the end position information of the selection area range information may also be a start tag line before a start content sub-block and an end tag line after a tail content sub-block, where the start tag line and the end tag line are determined according to boundary line positions displayed in the current edited document. As described in the preceding embodiments, for the user to visually see the selection area range in the document, boundary lines may be displayed in the document, and positions of the boundary lines are the position of the start tag line and the position of the end tag line. The selection area node may record operations with respect to the tag lines, so that whether the editing operation of the user falls in the selection area range between the start tag line and the end tag line is determined, and reference may be made to boundary lines shown in FIG. 4.

Embodiment Four

Figure 8:
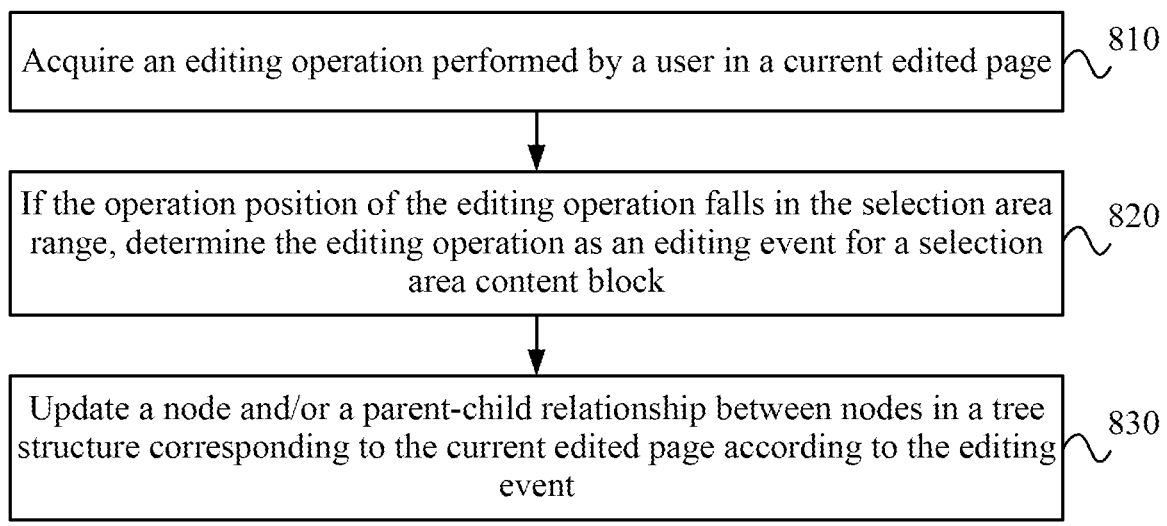
FIG. 8 is a flowchart of a document processing method based on a tree structure according to embodiment four of the present disclosure.

FIG. 8 is a flowchart of a document processing method based on a tree structure according to embodiment four of the present disclosure. The embodiment introduces the specific case of acquiring an editing event based on the preceding embodiments. The method includes the following.

In S810, an editing operation performed by a user in a current edited document is acquired.

The editing operations may include multiple types of operations such as addition, deletion and modification of document content, position movement, and addition, deletion and modification of quotation relationships. The manner in which the user inputs the editing operation may be typing through the keyboard, dragging content through the mouse or copying and pasting, which is not limited in the present application. The position of the document content on which the editing operation is performed may be within or outside a selection area range.

In S820, if the operation position of the editing operation falls in the selection area range, the editing operation is determined as an editing event for a selection area content block.

Position information recorded by selection area range information may be used for determining whether the operation position of the editing operation falls in the selection area range. The operation position of the editing operation may be a position of content that needs to be changed by the editing operation in the document; for example, the operation position may be an area occupied by characters, images or tables. It may be set that if the operation position partially or completely falls in the selection area range, it is determined that the operation position falls in the selection area range; or if the operation position partially or completely falls outside the selection area range, it is determined that the operation position does not fall in the selection area range.

There are multiple manners for determining whether the operation position falls in the selection area range as below.

In manner one, whether lines of the document occupied by the operation position all fall between a start line of the selection area range and a tail line of the selection area range is determined. In a case where the lines of the document occupied by the operation position all fall between the start line of the selection area range and the tail line of the selection area range, it is determined that the operation position falls in the selection area range; in a case where the lines of the document occupied by the operation position do not all fall between the start line of the selection area range and the tail line of the selection area range, it is determined that the operation position does not fall in the selection area range.

For example, if the last content sub-block within the selection area range is split into two content sub-blocks through a carriage return operation, after splitting, a first content sub-block of the two content sub-blocks which is located at the front is taken as a tail content sub-block of the selection area content block, and the last line of the first content sub-block is a tail line of the selection area range. At this time, a second content sub-block of the two content sub-blocks obtained after the splitting is beyond the tail line and falls outside the selection area range. Therefore, the action that the first half of the last content sub-block is obtained through splitting and editing falls in the selection area range, which is equivalent to changing content of the first half of the last content sub-block; the action that the second half of the last content sub-block is obtained through splitting and editing falls outside the selection area range, which is equivalent to newly establishing a content sub-block outside the selection area range, and the newly established content sub-block does not belong to the selection area content block. In some embodiments, if a tail content sub-block is split at a source position (for example, in a source document) of the selection area content block, the resulting change may be that a newly established content sub-block is not displayed in a target document (that is, a target position which quotes the selection area content block; when the source document and the target document are the same document, the source position of the selection area content block and the target position at which the selection area content block is quoted in the same document are different) which performs the quotation. Conversely, similar effects can also be achieved in the target document. In other embodiments, if a tail content sub-block is split at a target position which quotes the selection area content block, the resulting change may be that a newly established content sub-block (that is, a second half of the tail content sub-block obtained after the tail content sub-block is split) is displayed at both the source position and the target position.

In manner two, whether lines of the document occupied by the operation position all fall between a start tag line of the selection area range and a tail tag line of the selection area range is determined. In a case where the lines of the document occupied by the operation position all fall between the start tag line of the selection area range and the tail tag line of the selection area range, it is determined that the operation position falls in the selection area range; in a case where the lines of the document occupied by the operation position do not all fall between the start tag line of the selection area range and the tail tag line of the selection area range, it is determined that the operation position does not fall in the selection area range.

Splitting a tail content sub-block is still taken as an example. If a second half of the tail content sub-block generated during splitting still falls between the start tag line and the tail tag line, the second half of the tail content sub-block still belongs to the selection area content block, and the splitting editing operation falls in the selection area range.

In S830, a node and/or a parent-child relationship between nodes are updated in a tree structure corresponding to the current edited document according to the editing event.

The tree structure is updated according to whether the editing event falls in the selection area range. If a belonging relationship between the selection area content block and a content sub-block changes, a parent-child relationship between nodes is updated.

That the node and/or the parent-child relationship between the nodes are updated in the tree structure corresponding to the current edited document according to the editing event may include the cases described below.

If the editing event is newly adding a new content sub-clock within the selection area range, a content block node belonging to a document node is newly added to the tree structure, and a parent-child relationship between the newly added content block node and a selection area node is established.

If the editing event is deleting a content sub-block in the selection area content block, a parent-child relationship between the selection area node and the deleted content sub-block is deleted in the tree structure corresponding to the current edited document.

If a position order of content sub-blocks in the selection area content block is adjusted according to the editing event, position information of a content sub-block in a parent node of the content sub-block should be changed; for example, position information of a child node may be changed in the document node and/or the selection area node.

If the editing event is moving the selection area content block within the selection area range as a whole, the selection area range of the selection area node is updated in the tree structure.

According to the technical solutions of the embodiment, whether the editing event occurs within the selection area range is determined, so that centralized operations are performed on document content within the selection area range, and thus rich functions are provided for the user.

Based on the preceding embodiments, the method may further include the following An editing operation performed by the user in the current edited document is acquired.

If an operation position of the editing operation falls in a non-selection area range, the editing operation is performed, and a start position of the selection area range and an end position of the selection area range are updated according to the editing operation.

The non-selection area range may be located before or after the selection area range. If content is added before the position of the selection area, the start position of the selection area and the end position of the selection area may be simultaneously moved backward. If content is added after the position of the selection area, the position of the selection area may not be affected. After the position information of the selection area range changes, a record in the selection area node may be changed.

In the embodiment, the selection area content block is content quoted from the source document to the target document, the current edited document is the source document or the target document, and after a node and/or a parent-child relationship between nodes are updated, the following may be further included: a synchronous update is performed on the source document or the target document which is associated with the selection area content block according to the updated tree structure.

According to the above technical solutions, exemplarily, the tree structure of the document may be maintained in the server side, and when the tree structure is updated, the source document and the target document which have a quotation relationship with each other may be notified of performing a synchronous update based on the tree structure, so that content synchronization is maintained with simple and clear relationship logic of document content blocks.

According to the technical solutions of the embodiment of the present disclosure, the selection area content block is quoted, so that based on the implementation of underlying technologies, regardless of whether the content within the selection area range is carried in multiple content blocks or in a single content block, the content will be updated as quoted content at a quotation position. Therefore, in the selection area range, when the content within the selection area range is changed from being carried in one content block to being carried in multiple content blocks due to operations such as line feed, the quotation from the original content block is kept, and the number of the quoted content blocks is automatically and correspondingly changed according to the change of the selection area range; for example, quotation from a content block is newly added. In this manner, operations of the user are simpler, underlying processing logic is clearer, and the possibility of conflicts and inconsistency is reduced.

A typical operation of splitting a content sub-block is introduced based on the embodiments provided in the present disclosure, exemplarily as below.

In a case where the editing operation is a splitting operation for a tail content sub-block within the selection area range, that if the operation position of the editing operation falls in the selection area range, the editing operation is determined as the editing event for the selection area content block may include the following.

If a first half of the tail content sub-block obtained after the splitting operation is located within the selection area range and a second half of the tail content sub-block is located within the selection area range, the splitting operation is determined as the editing event for the selection area content block.

The splitting operation for the tail content sub-block, for example, may be to split the tail content block into two segments through set operations such as carriage return in the middle of the tail content sub-block to form two content sub-blocks. Of course, according to the definition of an independent content block, a content block may be split into a first half of the content block and a second half of the content block through other operations.

Optionally, that the node and/or the parent-child relationship between the nodes are updated in the tree structure corresponding to the current edited document according to the editing event includes the following.

If the current edited document is a source document, a content block version identifier of the first half of the tail content sub-block is updated in the tree structure of the source document according to the splitting operation, and a content block node of the second half of the tail content sub-block is newly established, where the newly established content block node has no parent-child relationship with the selection area node; and the content block version identifier of the first half of the tail content sub-block is updated in a tree structure of a target document.

If the current edited document is a target document, a content block node of the second half of the tail content sub-block is newly established in the tree structure of the target document and a tree structure of a source document according to the splitting operation, a parent-child relationship between the newly established content block node and the selection area node is established, and a content block version identifier of the first half of the tail content sub-block is updated in the tree structure of the source document and the tree structure of the target document.

As can be seen from the preceding operations, performing the splitting operation in the target document or the source document may bring different update effects, so that requirements for editing operations for the selection area content block of the author user are satisfied.

Embodiment Five

Figure 9:
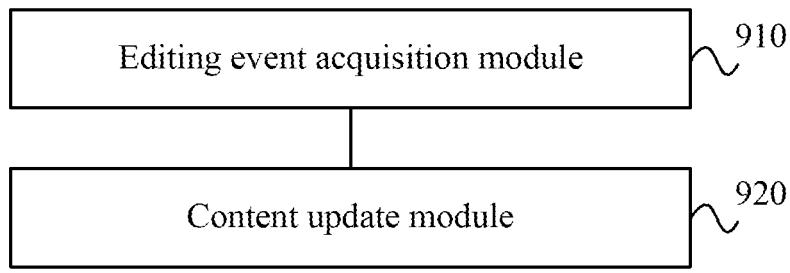
FIG. 9 is a block diagram of a document processing apparatus according to embodiment five of the present disclosure.

FIG. 9 is a block diagram of a document processing apparatus according to embodiment five of the present disclosure. The document processing apparatus includes an editing event acquisition module 910 and a content update module 920. The editing event acquisition module 910 is configured to acquire an editing event of a user for a selection area content block within a selection area range of a current edited document, where the selection area content block includes at least two content sub-blocks, the selection area content block is content quoted from a source document to a target document, and the current edited document is the source document or the target document. The content update module 920 is configured to perform a synchronous content change on a content block within the selection area range in the source document and the target document according to the editing event.

Based on the preceding embodiments, the editing event includes at least one of the following.

A content sub-block is newly added within the selection area range.

A content sub-block is deleted within the selection area range.

Content of a content sub-block is changed within the selection area range.

An order of two or more content sub-blocks is changed within the selection area range.

Based on the preceding embodiments, optionally, the content update module includes a content update unit and an update notification unit. The content update unit is configured to perform a content update on the content block within the selection area range in the current edited document according to the editing event. The update notification unit is configured to, in response to the current edited document being the source document, notify a server side of the editing event or updated content of the selection area content block in the current edited document to request the server side to perform a synchronous change on a selection area content block in at least one target document which quotes the selection area content block; in response to the current edited document being the target document, notify a server side of the editing event or updated content of the selection area content block in the current edited document to request the server side to perform a synchronous change on the selection area content block in the source document where the selection area content block is located and a selection area content block in another target document which quotes the selection area content block.

Based on the preceding embodiments, optionally, in a case where the content sub-blocks within the selection area range are consecutively set, position information of the selection area range includes start position information of the selection area range and end position information of the selection area range.

Based on the preceding embodiments, optionally, the selection area range is in units of lines in the current edited document.

Based on the preceding embodiments, optionally, the apparatus further includes a selection area range prompt module. The selection area range prompt module is configured to, before or during the process that the editing event of the user for the selection area content block within the selection area range of the current edited document is acquired, prompt the selection area range of the selection area content block in the current edited document in a set display manner, where the set display manner includes displaying a boundary line on an upper boundary of the selection area range and a boundary line on a lower boundary of the selection area range, or displaying the selection area range in a set background color, set transparency or a set layout style.

Based on the preceding embodiments, optionally, the editing event acquisition module is configured to acquire a dragging operation performed by the user on a content sub-block within the selection area range, and recognize the dragging operation as the editing event.

Based on the preceding embodiments, optionally, the editing event acquisition module includes an event type determination unit and a content update unit.

The event type determination unit is configured to recognize an event type of the editing event based on an end position of the dragging operation.

The content update unit is configured to update the content block within the selection area range in the source document and the content block within the selection area range in the target document based on the recognized event type.

Based on the preceding embodiments, optionally, the event type determination unit is configured to execute at least one of the following.

When the end position of the dragging operation is located outside the selection area range, the dragging operation is recognized as deleting a dragged content sub-block.

When the end position of the dragging operation is located inside the selection area range, the dragging operation is recognized as adjusting a display position of a dragged content sub-block.

Based on the preceding embodiments, optionally, the apparatus further includes a boundary prompt unit and a boundary position determination unit.

The boundary prompt unit is configured to display boundary information of the selection area range, and display an end position prompt identifier of the dragging operation when the dragging operation is performed.

The boundary position determination unit is configured to determine whether the end position of the dragging operation is located within the selection area range based on a position relationship between the end position prompt identifier and the boundary information at the end of the dragging operation.

Based on the preceding embodiments, optionally, the apparatus further includes a result preview module. The result preview module is configured to, in the process that the editing event of the user for the selection area content block within the selection area range of the current edited document is acquired, prompt an update result obtained after the selection area content block is updated through the editing event in a set preview manner in the current edited document, where the update result includes deletion of a content sub-block, movement of a content sub-block or new addition of a content sub-block.

The document processing apparatus provided in the embodiment of the present disclosure may be configured to execute the document processing method provided in the embodiments of the present disclosure, and has corresponding functions.

Embodiment Six

Figure 10:
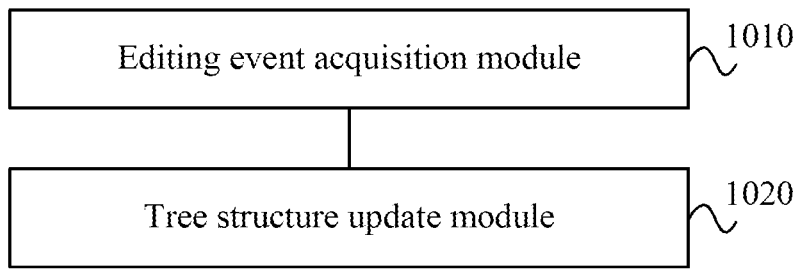
FIG. 10 is a block diagram of a document processing apparatus based on a tree structure according to embodiment six of the present disclosure.

FIG. 10 is a block diagram of a document processing apparatus based on a tree structure according to embodiment six of the present disclosure. The apparatus includes an editing event acquisition module 1010 and a tree structure update module 1020. The editing event acquisition module 1010 is configured to acquire an editing event of a user for a selection area content block within a selection area range of a current edited document, where the selection area content block includes at least two content sub-blocks. The tree structure update module 1020 is configured to update a node and/or a parent-child relationship between nodes in a tree structure corresponding to the current edited document according to the editing event. The tree structure includes a document node and content block nodes, the document node corresponds to the current edited document, the content block nodes correspond to content blocks, a parent-child relationship between multiple nodes represents a belonging relationship in the current edited document, a parent-child relationship exists between a selection area node of the selection area content block and respective content block nodes of the at least two content sub-blocks and is used for representing a belonging relationship.

Based on the preceding embodiments, optionally, the selection area node is configured to correspondingly record selection area range information and a parent node identifier of the selection area node.

Based on the preceding embodiments, optionally, the selection area range information includes start position information of a selection area and end position information of the selection area.

Alternatively, the selection area range information includes node identifier information of the selection area content block included in the selection area node.

Based the preceding embodiments, optionally, the start position information of the selection area range information and the end position information of the selection area range information are a start line of a start content sub-block and a tail line of a tail content sub-block.

Alternatively, the start position information of the selection area range information and the end position information of the selection area range information are a start tag line before a start content sub-block and an end tag line after a tail content sub-block, where the start tag line and the end tag line are determined according to boundary line positions displayed in the current edited document.

Based on the preceding embodiments, optionally, the selection area node is further configured to record a block version identifier of a historical editing version of the selection area content bock and an operation identifier of a historical editing operation of the selection area content block.

Based on the preceding embodiments, optionally, content block node is configured to correspondingly record entity content of a content block, a version identifier of a historical editing version of the content block and an operation identifier of a historical editing operation of the content block.

The document node is configured to correspondingly record entity content of a root content block of the current edited document, a block version identifier of a historical editing version of the root content block and an operation identifier of a historical editing operation of the root content block and is further configured to record a document version identifier of a historical editing version of the current edited document.

A node is further configured to record a parent node identifier and/or a child node identifier.

Based on the preceding embodiments, optionally, the document node is further configured to correspondingly record a position of a child node in the current edited document.

Based on the preceding embodiments, optionally, positions of the at least two content sub-blocks in the current edited document are consecutive or spaced apart from each other.

Based on the preceding embodiments, optionally, the editing event acquisition module 1010 includes a first editing operation acquisition unit and an operation-within-selection area range unit.

The first editing operation acquisition unit is configured to acquire an editing operation performed by the user in the current edited document.

The operation-within-selection area range unit is configured to, if an operation position of the editing operation falls in the selection area range, determine the editing operation as the editing event for the selection area content block.

Based on the preceding embodiments, optionally, in a case where the editing operation is a splitting operation performed on a tail content sub-block within the selection area range, the operation-within-selection area range unit is configured to, if a first half of the tail content sub-block obtained after the splitting operation is located within the selection area range and a second half of the tail content sub-block obtained after the splitting operation is located within the selection area range, determine the splitting operation as the editing event for the selection area content block.

Based on the preceding embodiments, optionally, the tree structure update module is configured to, if the current edited document is a source document, update a content block version identifier of the first half of the tail content sub-block in the tree structure of the source document according to the splitting operation, and newly establish a content block node of the second half of the tail content sub-block, where the newly established content block node has no parent-child relationship with the selection area node; and update the content block version identifier of the first half of the tail content sub-block in a tree structure of a target document; if the current edited document is a target document, newly establish a content block node of the second half of the tail content sub-block in the tree structure of the target document and a tree structure of a source document according to the splitting operation, establish a parent-child relationship between the newly established content block node and the selection area node, and update a content block version identifier of the first half of the tail content sub-block in the tree structure of the source document and the tree structure of the target document.

Based on the preceding embodiments, optionally, the apparatus further includes a second editing operation acquisition unit and an operation-outside-selection area range unit.

The second editing operation acquisition unit is configured to acquire an editing operation performed by the user in the current edited document.

The operation-outside-selection area range unit is configured to, if an operation position of the editing operation falls in a non-selection area range, perform the editing operation, and update a start position of the selection area range and an end position of the selection area range according to the editing operation.

Based on the preceding embodiments, optionally, the tree structure update module is configured to, if the editing event is newly adding a content sub-clock within the selection area range, newly add a content block node belonging to the document node in the tree structure, and establish a parent-child relationship between the newly added content block node and the selection area node.

Based on the preceding embodiments, optionally, the tree structure update module is configured to, if the editing event is moving the selection area content block within the selection area range as a whole, update the selection area range of the selection area node in the tree structure.

Based on the preceding embodiments, optionally, the selection area content block is content quoted from a source document to a target document, the current edited document is the source document or the target document, and the apparatus further includes a document synchronous update module. The document synchronous update module is configured to, after the node and/or the parent-child relationship between the nodes are updated, perform a synchronous update on the source document or the target document which is associated with the selection area content block according to the updated tree structure.

The document processing apparatus provided in the embodiment of the present disclosure may be configured to execute the document processing method provided in the embodiments of the present disclosure, and has corresponding functions.

Embodiment Seven

Figure 11:
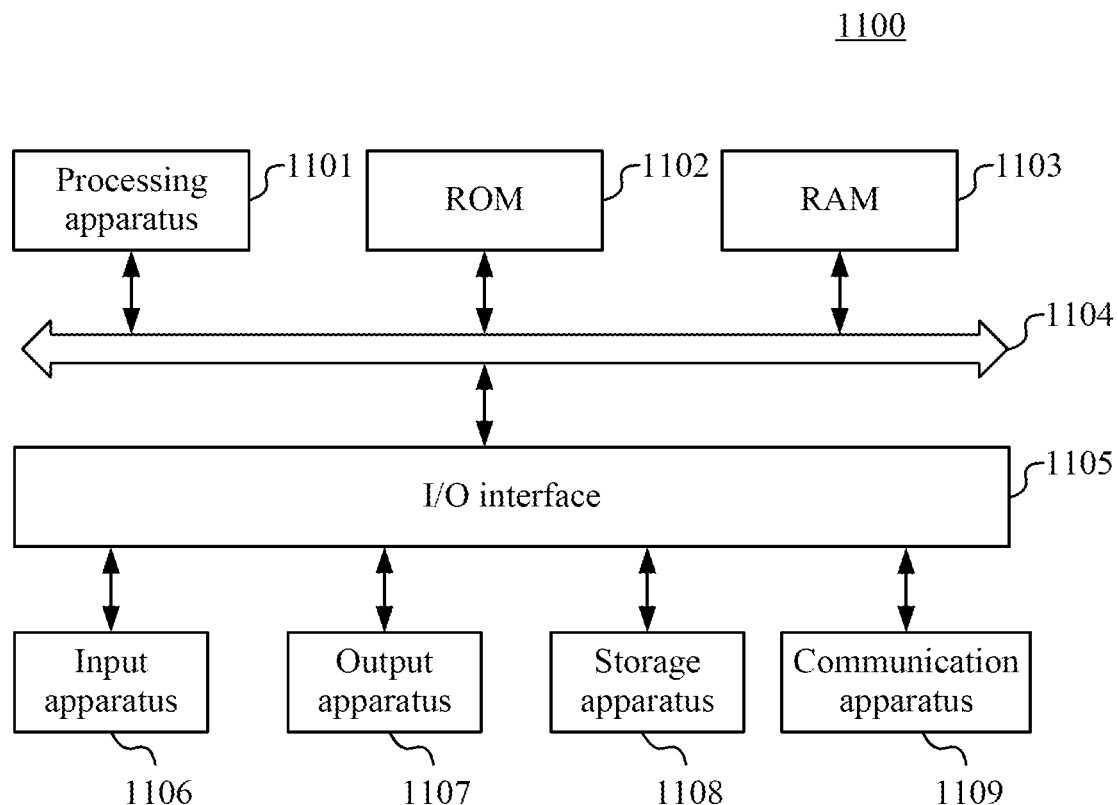
FIG. 11 is a block diagram of a document processing device according to embodiment seven of the present disclosure.

FIG. 11 is a block diagram of a document processing device according to embodiment seven of the present disclosure. Referring to FIG. 11, FIG. 11 shows a structural diagram of an electronic device (for example, including a terminal device or a server device) applicable to implementing the embodiments of the present disclosure. The terminal device in the embodiment of the present disclosure may include, but is not limited to, mobile terminals such as a mobile phone, a laptop, a digital broadcast receiver, a personal digital assistant (PDA), a portable Android device (PAD), a portable media player (PMP), and an in-vehicle terminal (such as an in-vehicle navigation terminal) and stationary terminals such as a digital television (TV) and a desktop computer. The electronic device shown in FIG. 11 is merely an example and is not intended to limit the function and use scope of the embodiments of the present disclosure.

As shown in FIG. 11, the electronic device 1100 may include a processing apparatus (such as a central processing unit or a graphics processing unit) 1101. The processing apparatus 1101 may perform various proper actions and processing according to a program stored in a read-only memory (ROM) 1102 or a program loaded into a random-access memory (RAM) 1103 from a storage apparatus 1106. Various programs and data required for operations of the electronic device 1100 are also stored in the RAM 1103. The processing apparatus 1101, the ROM 1102, and the RAM 1103 are connected to each other through a bus 1104. An input/output (I/O) interface 1105 is also connected to the bus 1104.

Generally, the following apparatuses may be connected to the I/O interface 1105: an input apparatus 1106 such as a touch screen, a touchpad, a keyboard, a mouse, a camera, a microphone, an accelerometer or a gyroscope; an output apparatus 1107 such as a liquid crystal display (LCD), a speaker or a vibrator; the storage apparatus 1106 such as a magnetic tape or a hard disk; and a communication apparatus 1109. The communication apparatus 1109 may allow the electronic device 1100 to perform wireless or wired communication with other devices to exchange data. Although FIG. 11 shows the electronic device 1100 having various apparatuses, it is to be understood that not all of the apparatuses shown here need to be implemented or present. Alternatively, more or fewer apparatuses may be implemented.

Particularly, according to the embodiments of the present disclosure, the processes described above with reference to the flowcharts may be implemented as computer software programs. For example, a computer program product is provided in an embodiment of the present disclosure. The computer program product includes a computer program carried on a non-transitory computer-readable medium. The computer program includes program codes for performing the method illustrated in any flowchart of the present disclosure. In such an embodiment, the computer program may be downloaded and installed from a network through the communication apparatus 1109, installed from the storage apparatus 1106, or installed from the ROM 1102. When the computer program is executed by the processing apparatus 1101, the preceding functions defined in the methods in the embodiments of the present disclosure are implemented.

It is to be noted that the preceding computer-readable medium in the present disclosure may be a computer-readable signal medium or a computer-readable storage medium or any combination thereof. For example, the computer-readable storage medium may be, but is not limited to, an electrical, magnetic, optical, electromagnetic, infrared or semiconductor system, apparatus or device or any combination thereof. Specifically, the computer-readable storage medium may include, but is not limited to, an electrical connection having one or more wires, a portable computer disk, a hard disk, a random-access memory (RAM), a read-only memory (ROM), an erasable programmable read-only memory (EPROM) or a flash memory, an optical fiber, a portable compact disc read-only memory (CD-ROM), an optical memory device, a magnetic memory device or any suitable combination thereof. In the present disclosure, the computer-readable storage medium may be any tangible medium including or storing a program that can be used by or in combination with an instruction execution system, apparatus or device. In the present disclosure, the computer-readable signal medium may include a data signal propagated on a baseband or as part of a carrier, where computer-readable program codes are carried in the data signal. The data signal propagated in this manner may be in multiple forms and includes, but is not limited to, an electromagnetic signal, an optical signal or any suitable combination thereof. The computer-readable signal medium may also be any computer-readable medium except the computer-readable storage medium. The computer-readable signal medium may send, propagate or transmit a program used by or in combination with an instruction execution system, apparatus or device. Program codes included on the computer-readable medium may be transmitted by any suitable medium, including, but not limited to, a wire, an optical cable, a radio frequency (RF) or any suitable combination thereof.

In some implementations, clients and servers may communicate using any network protocol currently known or to be developed in the future, such as HyperText Transfer Protocol (HTTP), and may be interconnected with any form or medium of digital data communication (such as a communication network). Examples of the communication network include a local area network (LAN), a wide area network (WAN), an inter-network (for example, the Internet), a peer-to-peer network (for example, an ad hoc network), and any network currently known or to be developed in the future.

The preceding computer-readable medium may be included in the preceding electronic device or may exist alone without being assembled into the electronic device.

The preceding computer-readable medium carries at least one program which, when executed by the electronic device, causes the electronic device to: acquire an editing event of a user for a selection area content block within a selection area range of a current edited document, where the selection area content block includes at least two content sub-blocks, the selection area content block is content quoted from a source document to a target document, and the current edited document is the source document or the target document; and perform a synchronous content change on a content block within the selection area range in the source document and a content block within the selection area range in the target document according to the editing event.

Alternatively, the preceding computer-readable medium carries at least one program which, when executed by the electronic device, causes the electronic device to: acquire an editing event of a user for a selection area content block within a selection area range of a current edited document, where the selection area content block includes at least two content sub-blocks; and update a node and/or a parent-child relationship between nodes in a tree structure corresponding to the current edited document according to the editing event. The tree structure includes a document node and content block nodes, the document node corresponds to the current edited document, the content block nodes correspond to content blocks, a parent-child relationship between multiple nodes represents a belonging relationship in the current edited document, a parent-child relationship exists between a selection area node of the selection area content block and respective content block nodes of the at least two content sub-blocks and is used for representing a belonging relationship.

Computer program codes for executing operations in the present disclosure may be written in one or more programming languages or a combination thereof. The preceding programming languages include, but are not limited to, object-oriented programming languages such as Java, Smalltalk or C++, as well as conventional procedural programming languages such as C or a similar programming language. The program codes may be executed entirely on a user computer, executed partly on a user computer, executed as a stand-alone software package, executed partly on a user computer and partly on a remote computer, or executed entirely on a remote computer or a server. In the case where the remote computer is involved, the remote computer may be connected to the user computer via any type of network including a local area network (LAN) or a wide area network (WAN) or may be connected to an external computer (for example, via the Internet through an Internet service provider).

The flowcharts and block diagrams in the drawings show the possible architecture, function and operation of the system, method and computer program product according to various embodiments of the present disclosure. In this regard, each block in the flowcharts or block diagrams may represent a module, program segment or part of codes, where the module, program segment or part of codes includes at least one executable instruction for implementing specified logical functions. It is to be noted that in some alternative implementations, the functions marked in the blocks may occur in an order different from that marked in the drawings. For example, two successive blocks may, in practice, be executed substantially in parallel or executed in a reverse order, which depends on the functions involved. It is also to be noted that each block in the block diagrams and/or flowcharts and a combination of blocks in the block diagrams and/or flowcharts may be implemented by a special-purpose hardware-based system executing specified functions or operations or may be implemented by a combination of special-purpose hardware and computer instructions.

The units involved in the embodiments of the present disclosure may be implemented by software or hardware. The names of the units do not constitute a limitation on the units themselves. For example, a first acquisition unit may also be described as "a unit for acquiring at least two Internet protocol addresses".

The functions described above herein may be at least partially implemented by at least one hardware logic component. For example, without limitation, example types of hardware logic components that can be used include a field-programmable gate array (FPGA), an application-specific integrated circuit (ASIC), an application-specific standard parts (ASSP), a system-on-chip (SoC), a complex programmable logic device (CPLD), etc.

In the context of the present disclosure, a machine-readable medium may be a tangible medium including or storing a program that can be used by or in combination with an instruction execution system, apparatus or device. The machine-readable medium may be a machine-readable signal medium or a machine-readable storage medium. The machine-readable medium may include, but is not limited to, an electronic, magnetic, optical, electromagnetic, infrared or semiconductor system, apparatus or device or any appropriate combination thereof. Concrete examples of the machine-readable storage medium include an electrical connection based on at least one wire, a portable computer disk, a hard disk, a random-access memory (RAM), a read-only memory (ROM), an erasable programmable read-only memory (EPROM) or a flash memory, an optical fiber, a portable compact disc read-only memory (CD-ROM), an optical storage device, a magnetic storage device or any suitable combination thereof.

According to at least one embodiment of the present disclosure, a document processing method is provided. The method includes the following.

An editing event of a user for a selection area content block within a selection area range of a current edited document is acquired, where the selection area content block includes at least two content sub-blocks, the selection area content block is content quoted from a source document to a target document, and the current edited document is the source document or the target document.

A synchronous content change is performed on a content block within the selection area range in the source document and a content block within the selection area range in the target document according to the editing event.

In the preceding method, the editing event includes at least one of the following.

A content sub-block is newly added within the selection area range.

A content sub-block is deleted within the selection area range.

Content of a content sub-block is changed within the selection area range.

In the preceding method, that the synchronous content change is performed on the content block within the selection area range in the source document and the content block within the selection area range in the target document according to the editing event includes the following.

A content update is performed on the content block within the selection area range in the current edited document according to the editing event.

In response to the current edited document being the source document, a server side is notified of the editing event or updated content of the selection area content block in the current edited document so that the server side is requested to perform a synchronous change on a selection area content block in at least one target document which quotes the selection area content block; in response to the current edited document being the target document, a server side is notified of the editing event or updated content of the selection area content block in the current edited document so that the server side is requested to perform a synchronous change on the selection area content block in the source document where the selection area content block is located and a selection area content block in another target document which quotes the selection area content block.

In the preceding method, in a case where the at least two content sub-blocks within the selection area range are consecutively set, position information of the selection area range includes start position information of the selection area range and end position information of the selection area range.

In the preceding method, the selection area range is in units of lines in the current edited document.

In the preceding method, before or during the process that the editing event of the user for the selection area content block within the selection area range of the current edited document is acquired, the following is further included.

The selection area range of the selection area content block is prompted in a set display manner in the current edited document, where the set display manner includes displaying a boundary line on an upper boundary of the selection area range and a boundary line on a lower boundary of the selection area range, or displaying the selection area range in a set background color, set transparency or a set layout style.

In the preceding method, that the editing event that the user deletes a content sub-block within the selection area range of the current edited document is acquired includes the following.

A dragging operation performed by the user on a content sub-block within the selection area range is acquired, and the dragging operation is recognized as the editing event.

In the preceding method, that the dragging operation is recognized as the editing event includes the following.

An event type of the editing event is recognized based on an end position of the dragging operation.

The content block within the selection area range in the source document and the content block within the selection area range in the target document are updated based on the recognized event type.

In the preceding method, that the event type of the editing event is recognized based on the end position of the dragging operation includes at least one of the following.

When the end position of the dragging operation is located outside the selection area range, the dragging operation is recognized as deleting a dragged content block.

When the end position of the dragging operation is located within the selection area range, the dragging operation is recognized as adjusting a display position of a dragged content block.

The preceding method further includes the following.

Boundary information of the selection area range is displayed, and an end position prompt identifier of the dragging operation is displayed when the dragging operation is performed.

Whether the end position of the dragging operation is located within the selection area range is determined based on a position relationship between the end position prompt identifier and the boundary information at an end of the dragging operation.

In the preceding method, during the process that the editing event of the user for the selection area content block within the selection area range of the current edited document is acquired, the following is further included.

An update result obtained after the selection area content block is updated through the editing event is prompted in a set preview manner in the current edited document.

The update result includes deletion of a content sub-block, movement of a content sub-block or new addition of a content sub-block.

According to at least one embodiment of the present disclosure, a document processing method based on a tree structure is provided. The method includes the following.

An editing event of a user for a selection area content block within a selection area range of a current edited document is acquired, where the selection area content block includes at least two content sub-blocks.

A node and/or a parent-child relationship between nodes is updated in a tree structure corresponding to the current edited document according to the editing event.

The tree structure includes a document node and content block nodes, the document node corresponds to the current edited document, the content block nodes correspond to content blocks, a parent-child relationship between multiple nodes represents a belonging relationship in the current edited document, a parent-child relationship exists between a selection area node of the selection area content block and respective content block nodes of the at least two content sub-blocks and is used for representing a belonging relationship.

In the preceding method, the selection area node is configured to correspondingly record selection area range information and a parent node identifier of the selection area node.

In the preceding method, the selection area range information includes start position information of a selection area and end position information of the selection area.

Alternatively, the selection area range information includes node identifier information of the selection area content block included in the selection area node.

In the preceding method, the start position information of the selection area range information is a start line of a start content sub-block, and the end position information of the selection area range information is a tail line of a tail content sub-block.

Alternatively, the start position information of the selection area range information is a start tag line before a start content sub-block, and the end position information of the selection area range information is an end tag line after a tail content sub-block, where the start tag line and the end tag line are determined according to boundary line positions displayed in the current edited document.

In the preceding method, the selection area node is further configured to record a block version identifier of a historical editing version of the selection area content block and an operation identifier of a historical editing operation of the selection area content block.

In the preceding method, a content block node is configured to correspondingly record entity content of a content block, a version identifier of a historical editing version of the content block and an operation identifier of a historical editing operation of the content block.

The document node is configured to correspondingly record entity content of a root content block of the current edited document, a block version identifier of a historical editing version of the root content block and an operation identifier of a historical editing operation of the root content block and is further configured to record a document version identifier of a historical editing version of the current edited document.

A node is further configured to record a parent node identifier and/or a child node identifier.

In the preceding method, the document node is further configured to correspondingly record a position of a child node in the document.

In the preceding method, positions of the at least two content sub-blocks in the current edited document are consecutive or spaced apart from each other.

In the preceding method, that the editing event of the user for the selection area content block within the selection area range of the current edited document is acquired includes the following.

An editing operation performed by the user in the current edited document is acquired.

If an operation position of the editing operation falls in the selection area range, the editing operation is determined as the editing event for the selection area content block.

In the preceding method, in a case where the editing operation is a splitting operation performed on a tail content sub-block within the selection area range, that if the operation position of the editing operation falls in the selection area range, the editing operation is determined as the editing event for the selection area content block includes the following.

If a first half of the tail content sub-block obtained after the splitting operation is located within the selection area range and a second half of the tail content sub-block is located within the selection area range, the splitting operation is determined as the editing event for the selection area content block.

In the preceding method, that the node and/or the parent-child relationship between the nodes is updated in the tree structure corresponding to the current edited document according to the editing event includes the following.

If the current edited document is a source document, a content block version identifier of the first half of the tail content sub-block is updated in the tree structure of the source document according to the splitting operation, and a content block node of the second half of the tail content sub-block is newly established, where the newly established content block node has no parent-child relationship with the selection area node; and the content block version identifier of the first half of the tail content sub-block is updated in a tree structure of a target document.

If the current edited document is a target document, a content block node of the second half of the tail content sub-block is newly established in the tree structure of the target document and a tree structure of a source document according to the splitting operation, a parent-child relationship between the newly established content block node and the selection area node is established, and a content block version identifier of the first half of the tail content sub-block is updated in the tree structure of the source document and the tree structure of the target document.

The preceding method further includes the following.

An editing operation performed by the user in the current edited document is acquired.

If an operation position of the editing operation falls in a non-selection area range, the editing operation is performed, and a start position of the selection area range and an end position of the selection area range are updated according to the editing operation.

In the preceding method, that the node and/or the parent-child relationship between the nodes are updated in the tree structure corresponding to the current edited document according to the editing event includes the following.

If the editing event is newly adding a content sub-clock within the selection area range, a content block node belonging to the document node is newly added to the tree structure, and a parent-child relationship between the newly added content block node and the selection area node is established.

In the preceding method, that the node and/or the parent-child relationship between nodes is updated in the tree structure corresponding to the current edited document according to the editing event includes the following.

If the editing event is moving the selection area content block within the selection area range as a whole, the selection area range of the selection area node is updated in the tree structure.

In the preceding method, the selection area content block is content quoted from a source document to a target document, the current edited document is the source document or the target document, and after the node and/or the parent-child relationship between the nodes are updated, the following is further included.

A synchronous update is performed on the source document or the target document which is associated with the selection area content block according to the updated tree structure.

According to at least one embodiment of the present disclosure, a document processing apparatus is provided. The apparatus includes an editing event acquisition module and a content update module.

The editing event acquisition module is configured to acquire an editing event of a user for a selection area content block within a selection area range of a current edited document, where the selection area content block includes at least two content sub-blocks, the selection area content block is content quoted from a source document to a target document, and the current edited document is the source document or the target document.

The content update module is configured to perform a synchronous content change on a content block within the selection area range in the source document and a content block within the selection area range in the target document according to the editing event.

According to at least one embodiment of the present disclosure, a document processing apparatus based on a tree structure is provided. The apparatus includes an editing event acquisition module and a tree structure update module.

The editing event acquisition module is configured to acquire an editing event of a user for a selection area content block within a selection area range of a current edited document, where the selection area content block includes at least two content sub-blocks.

The tree structure update module is configured to update a node and/or a parent-child relationship between nodes in a tree structure corresponding to the current edited document according to the editing event.

The tree structure includes a document node and content block nodes, the document node corresponds to the current edited document, the content block nodes correspond to content blocks, a parent-child relationship between multiple nodes represents a belonging relationship in the current edited document, a parent-child relationship exists between a selection area node of the selection area content block and respective content block nodes of the at least two content sub-blocks and is used for representing a belonging relationship.

According to at least one embodiment of the present disclosure, a document processing device is provided. The device includes at least one processor and a memory configured to store at least one program.

The at least one program, when executed by the at least one processor, causes the at least one processor to perform the document processing method provided in the embodiments of the present disclosure or the document processing method based on a tree structure provided in the embodiments of the present disclosure.

According to at least one embodiment of the present disclosure, a computer storage medium is further provided. The medium stores a computer program, where the computer program, when executed by a processor, performs the document processing method provided in the embodiments of the present disclosure or the document processing method based on a tree structure provided in the embodiments of the present disclosure.

The preceding description is merely illustrative of optional embodiments of the present disclosure and the technical principles used therein. It is to be understood by those skilled in the art that the scope of disclosure involved in the present disclosure is not limited to the technical solutions formed by particular combinations of the preceding technical features and should also cover other technical solutions formed by any combination of the preceding technical features or their equivalents without departing from the concept of the present disclosure, for example, technical solutions formed by the substitutions of the preceding features with the technical features (not limited to being) disclosed in the present disclosure and having similar functions.

Additionally, although operations are depicted in a particular order, this should not be construed as that these operations are required to be performed in the particular order shown or in a sequential order. In certain circumstances, multitasking and parallel processing may be advantageous. Similarly, although several specific implementation details are included in the preceding discussion, these should not be construed as limitations on the scope of the present disclosure. Certain features described in the context of separate embodiments may also be implemented in combination in a single embodiment. Conversely, various features described in the context of a single embodiment may also be implemented in multiple embodiments individually or in any suitable sub-combination.

What is claimed is:

1. A document processing method, comprising:
acquiring an editing event of a user for a selection area content block within a selection area range of a current edited document, wherein the selection area content block comprises at least two content sub-blocks, the selection area content block is content quoted from a source document to a target document, and the current edited document is the source document or the target document; and
in response to the editing event that happened in a selection area range of the target document, performing a synchronous content change on a content block within the selection area range in the source document; or in response to the editing event that happened in a selection area range of the source document, performing a synchronous content change on a content block within the selection area range in the target document;
wherein acquiring the editing event of the user for the selection area content block within the selection area range of the current edited document comprises:

acquiring a dragging operation performed by the user on a content sub-block within the selection area range, and recognizing the dragging operation as the editing event;
wherein recognizing the dragging operation as the editing event comprises:
recognizing an event type of the editing event based on an end position of the dragging operation; and
updating, based on the recognized event type, the content block within the selection area range in the source document and the content block within the selection area range in the target document; and
wherein recognizing the event type of the editing event based on the end position of the dragging operation comprises:
in response to the end position of the dragging operation being located outside the selection area range, recognizing the dragging operation as deleting a dragged content sub-block.

2. The document processing method according to claim 1, wherein the editing event comprises at least one of the following:
newly adding a content sub-block within the selection area range;
deleting a content sub-block within the selection area range;
changing content of a content sub-block within the selection area range; or
changing an order of at least two content sub-blocks within the selection area range.

3. The document processing method according to claim 1, wherein performing the synchronous content change on the content block within the selection area range in the source document and the content block within the selection area range in the target document according to the editing event comprises:
performing a content update on the content block within the selection area range in the current edited document according to the editing event; and
in response to the current edited document being the source document, notifying a server side of the editing event or updated content of the selection area content block in the current edited document, so that the server side is requested to perform a synchronous change on a selection area content block in at least one target document which quotes the selection area content block; in response to the current edited document being the target document, notifying a server side of the editing event or updated content of the selection area content block in the current edited document, so that the server side is requested to perform a synchronous change on the selection area content block in the source document where the selection area content block is located and the selection area content block in another target document which quotes the selection area content block.

4. The document processing method according to claim 1, wherein in a case where the at least two content sub-blocks within the selection area range are consecutively set, position information of the selection area range comprises start position information of the selection area range and end position information of the selection area range.

5. The document processing method according to claim 1, wherein the selection area range is in units of lines in the current edited document.

6. The document processing method according to claim 1, before or during acquiring the editing event of the user for the selection area content block within the selection area range of the current edited document, further comprising:
prompting the selection area range of the selection area content block in a set display manner in the current edited document, wherein the set display manner comprises displaying a boundary line on an upper boundary of the selection area range and a boundary line on a lower boundary of the selection area range; or displaying the selection area range in a set background color, set transparency or a set layout style.

7. The document processing method according to claim 1, wherein recognizing the event type of the editing event based on the end position of the dragging operation further comprises:
in response to the end position of the dragging operation being located within the selection area range, recognizing the dragging operation as adjusting a display position of a dragged content sub-block; or
wherein the document processing method further comprises:
displaying boundary information of the selection area range, and when the dragging operation is performed, displaying an end position prompt identifier of the dragging operation; and
determining whether the end position of the dragging operation is located within the selection area range based on a position relationship between the end position prompt identifier and the boundary information at an end of the dragging operation.

8. The document processing method according to claim 1, during acquiring the editing event of the user for the selection area content block within the selection area range of the current edited document, further comprising:
prompting an update result obtained after the selection area content block is updated through the editing event in a set preview manner in the current edited document, wherein the update result comprises deletion of a content sub-block, movement of a content sub-block or new addition of a content sub-block; or
wherein acquiring the editing event of the user for the selection area content block within the selection area range of the current edited document comprises:
when a splitting operation is performed on a tail content sub-block of the selection area content block, performing at least one of following operations:
in a case where the splitting operation is performed at a source position of the selection area content block, displaying, at a target position which quotes the selection area content block, a first half of content obtained after the tail content sub-block is split and not displaying a second half of the content obtained after the tail content sub-block is split; or
in a case where the tail content sub-block is split at a target position which quotes the selection area content block, displaying, at both a source position and the target position, a first half of content obtained after the tail content sub-block is split and a second half of the content after the tail content sub-block is split.

9. A document processing method based on a tree structure, comprising:
acquiring an editing event of a user for a selection area content block within a selection area range of a current edited document, wherein the selection area content block comprises at least two content sub-blocks, and the current edited document is a source document or a target document; and updating, according to the editing event, at least one of a parent-child relationship between nodes or a node in a tree structure corresponding to the current edited document;

wherein the tree structure comprises a document node and content block nodes, the document node corresponds to a document, the content block nodes correspond to content blocks, a parent-child relationship between a plurality of nodes represents a belonging relationship in the current edited document, a parent-child relationship exists between a selection area node of the selection area content block and respective content block nodes of the at least two content sub-blocks and is used for representing a belonging relationship;

wherein acquiring the editing event of the user for the selection area content block within the selection area range of the current edited document comprises:
  acquiring a dragging operation performed by the user on a content sub-block within the selection area range, and recognizing the dragging operation as the editing event;

wherein recognizing the dragging operation as the editing event comprises:
  recognizing an event type of the editing event based on an end position of the dragging operation; and
  updating, based on the recognized event type, the content block within the selection area range in the source document and the content block within the selection area range in the target document; and wherein recognizing the event type of the editing event based on the end position of the dragging operation comprises:
  in response to the end position of the dragging operation being located outside the selection area range, recognizing the dragging operation as deleting a dragged content sub-block.

10. The document processing method according to claim 9, wherein the selection area node is configured to correspondingly record selection area range information and a parent node identifier of the selection area node.

11. The document processing method according to claim 10, wherein the selection area range information comprises start position information of a selection area and end position information of the selection area; or the selection area range information comprises node identifier information of the selection area content block comprised in the selection area node; or
  wherein the start position information of the selection area range information is a start line of a start content sub-block, and the end position information of the selection area range information is a tail line of a tail content sub-block; or the start position information of the selection area range information is a start tag line before a start content sub-block, and the end position information of the selection area range information is an end tag line after a tail content sub-block, wherein the start tag line and the end tag line are determined according to boundary line positions displayed in the current edited document.

12. The document processing method according to claim 10, wherein the selection area node is further configured to record a block version identifier of a historical editing version of the selection area content bock and an operation identifier of a historical editing operation of the selection area content block.

13. The document processing method according to claim 9, wherein a content block node is configured to correspondingly record entity content of a content block, a version identifier of a historical editing version of the content block and an operation identifier of a historical editing operation of the content block;
  the document node is configured to correspondingly record entity content of a root content block of the document, a block version identifier of a historical editing version of the root content block and an operation identifier of a historical editing operation of the root content block and is further configured to record a document version identifier of a historical editing version of the document;
  the node is further configured to record at least one of a parent node identifier or a child node identifier; or
  the document node is further configured to correspondingly record a position of a child node in the document.

14. The document processing method according to claim 9, wherein positions of the at least two content sub-blocks in the current edited document are consecutive or spaced apart from each other.

15. The document processing method according to claim 9, wherein acquiring the editing event of the user for the selection area content block within the selection area range of the current edited document comprises:
  acquiring an editing operation performed by the user in the current edited document; and
  in response to an operation position of the editing operation falling in the selection area range, determining the editing operation as the editing event for the selection area content block.

16. The document processing method according to claim 9, wherein in a case where the editing operation is a splitting operation performed on a tail content sub-block within the selection area range, in response to the operation position of the editing operation falling in the selection area range, determining the editing operation as the editing event for the selection area content block comprises:
  in response to a first half of the tail content sub-block obtained after the splitting operation being located within the selection area range and a second half of the tail content sub-block obtained after the splitting operation being located within the selection area range, determining the splitting operation as the editing event for the selection area content block.

17. The document processing method according to claim 16, wherein updating the at least one of the parent-child relationship between the nodes or the node in the tree structure corresponding to the current edited document according to the editing event comprises at least one of the following:
  in a case where the current edited document is the source document, updating a content block version identifier of the first half of the tail content sub-block in the tree structure of the source document according to the splitting operation, and newly establishing a content block node of the second half of the tail content sub-block, wherein the newly established content block node has no parent-child relationship with the selection area node; and updating the content block version identifier of the first half of the tail content sub-block in a tree structure of the target document;
  in a case where the current edited document is the target document, newly establishing a content block node of the second half of the tail content sub-block in the tree structure of the target document and a tree structure of the source document according to the splitting operation, establishing a parent-child relationship between the newly established content block node and the selection area node, and updating a content block version identifier of the first half of the tail content sub-block in the tree structure of the source document and the tree structure of the target document.

18. The document processing method according to claim 9, further comprising:
acquiring an editing operation performed by the user in the current edited page; and
in response to an operation position of the editing operation falling in a non-selection area range, performing the editing operation, and updating a start position of the selection area range and an end position of the selection area range according to the editing operation; or
wherein updating the at least one of the parent-child relationship between the nodes or the node in the tree structure corresponding to the current edited document according to the editing event comprises:
in response to the editing event being newly adding a content sub-clock within the selection area range, newly adding a content block node belonging to the document node in the tree structure, and establishing a parent-child relationship between the newly added content block node and the selection area node; or
wherein updating the at least one of the parent-child relationship between the nodes or the node in the tree structure corresponding to the current edited document according to the editing event comprises:
in response to the editing event being moving the selection area content block within the selection area range as a whole, updating the selection area range of the selection area node in the tree structure; or
wherein the selection area content block is content quoted from a source document to a target document, the current edited document is the source document or the target document, and after updating the at least one of the parent-child relationship between the nodes or the node, the document processing method further comprises:
performing a synchronous update on the source document or the target document which is associated with the selection area content block according to the updated tree structure.

19. A document processing device, comprising:
at least one processor; and
a memory configured to store at least one program;
wherein the at least one program, when executed by the at least one processor, causes the at least one processor to perform:
acquiring an editing event of a user for a selection area content block within a selection area range of a current edited document, wherein the selection area content block comprises at least two content sub-blocks, the selection area content block is content quoted from a source document to a target document, and the current edited document is the source document or the target document; and
in response to the editing event that happened in a selection area range of the target document, performing a synchronous content change on a content block within the selection area range in the source document; or in response to the editing event that happened in a selection area range of the source document, performing a synchronous content change on a content block within the selection area range in the target document;
wherein acquiring the editing event of the user for the selection area content block within the selection area range of the current edited document comprises:
acquiring a dragging operation performed by the user on a content sub-block within the selection area range, and recognizing the dragging operation as the editing event;
wherein recognizing the dragging operation as the editing event comprises:
recognizing an event type of the editing event based on an end position of the dragging operation; and
updating, based on the recognized event type, the content block within the selection area range in the source document and the content block within the selection area range in the target document; and
wherein recognizing the event type of the editing event based on the end position of the dragging operation comprises:
in response to the end position of the dragging operation being located outside the selection area range, recognizing the dragging operation as deleting a dragged content sub-block.

20. A non-transitory computer storage medium storing a computer program, wherein the computer program, when executed by a processer, performs the document processing document processing method according to claim 1.

* * * * *